United States Patent
Van Spronsen et al.

(10) Patent No.: US 12,157,617 B2
(45) Date of Patent: Dec. 3, 2024

(54) PLASTIC SPOUT AND POUCH PACKAGING

(71) Applicant: Scholle IPN IP BV, SX Tilburg (NL)

(72) Inventors: Frederik Adriaan Van Spronsen, SX Tilburg (NL); Jeroen Pieter Fiere, SX Tilburg (NL); Johannes Wilhelmus Van Tuil, Barcelona (ES)

(73) Assignee: SIG Services AG, Neuhausen Am Rheinfall (CH)

( * ) Notice: Subject to any disclaimer, the term of this patent is extended or adjusted under 35 U.S.C. 154(b) by 0 days.

(21) Appl. No.: 17/799,921

(22) PCT Filed: Feb. 10, 2021

(86) PCT No.: PCT/EP2021/053217
§ 371 (c)(1),
(2) Date: Aug. 15, 2022

(87) PCT Pub. No.: WO2021/160675
PCT Pub. Date: Aug. 19, 2021

(65) Prior Publication Data
US 2023/0094576 A1   Mar. 30, 2023

(30) Foreign Application Priority Data

Feb. 14, 2020 (NL) ..................................... 2024915
Oct. 23, 2020 (NL) ..................................... 2026752

(51) Int. Cl.
*B65D 75/58* (2006.01)

(52) U.S. Cl.
CPC ............................... *B65D 75/5883* (2013.01)

(58) Field of Classification Search
CPC ..... B65D 75/5883; B29C 65/18; B29C 65/32; B29C 66/0044; B29C 66/1122;
(Continued)

(56) References Cited

U.S. PATENT DOCUMENTS

2004/0256410 A1* 12/2004 Last ....................... B65D 25/48
222/92
2009/0139993 A1* 6/2009 Last ...................... B29C 66/324
215/44
(Continued)

FOREIGN PATENT DOCUMENTS

DE 202006013587 U1 1/2008
EP 1897815 B1 * 8/2016 ......... B65D 75/5883
(Continued)

*Primary Examiner* — Bob Zadeh
(74) *Attorney, Agent, or Firm* — The Watson IP Group, PLC; Jovan N. Jovanovic

(57) ABSTRACT

A spout (1, 401, 601) having a plastic spout body which comprises an attachment portion (10, 410, 610) having a vertical first plane of symmetry (M1) with a vertical first sealing wall (11, 411, 611) and an opposed vertical second sealing wall (12, 412, 612), and with a transverse wall (20), which is integrally connected to an upper edge of the first sealing wall and to an upper edge of the second sealing wall, wherein the first sealing wall and the second sealing wall each depend from said transverse wall and each have a bottom edge (114, 115, 541, 515, 714, 715) remote from the upper edge. Each sealing wall is, seen in a bottom view of the attachment portion, composed of a first rectilinear portion (111, 121, 511, 521, 711, 721), a central curved portion (113, 123, 513, 523, 713, 723), and a second rectilinear portion (112, 122, 512, 522, 712, 722). The spout body has a tubular neck (30) having a bore (31) that adjoins an opening (21) in the transverse wall. The attachment portion further comprises curved stabilizing ribs (15, 16, 151, 161, 152, 162) extending between associated connection points to the opposed rectilinear portions of the sealing walls.

16 Claims, 23 Drawing Sheets

(58) Field of Classification Search
CPC ........ B29C 66/43121; B29C 66/53263; B29C 66/81431; B29C 66/81811; B29C 66/83221
See application file for complete search history.

(56) References Cited

U.S. PATENT DOCUMENTS

| | | | |
|---|---|---|---|
| 2013/0284769 A1* | 10/2013 | Schick | B29C 66/221 |
| | | | 222/566 |
| 2016/0272379 A1* | 9/2016 | Skillin | B65D 47/0838 |
| 2023/0094576 A1* | 3/2023 | Van Spronsen | B29C 65/18 |
| | | | 222/566 |

FOREIGN PATENT DOCUMENTS

| | | | | |
|---|---|---|---|---|
| JP | 2002104453 A | | 4/2002 | |
| WO | WO-2013074953 A1 * | 5/2013 | ......... | B65D 75/5883 |

* cited by examiner

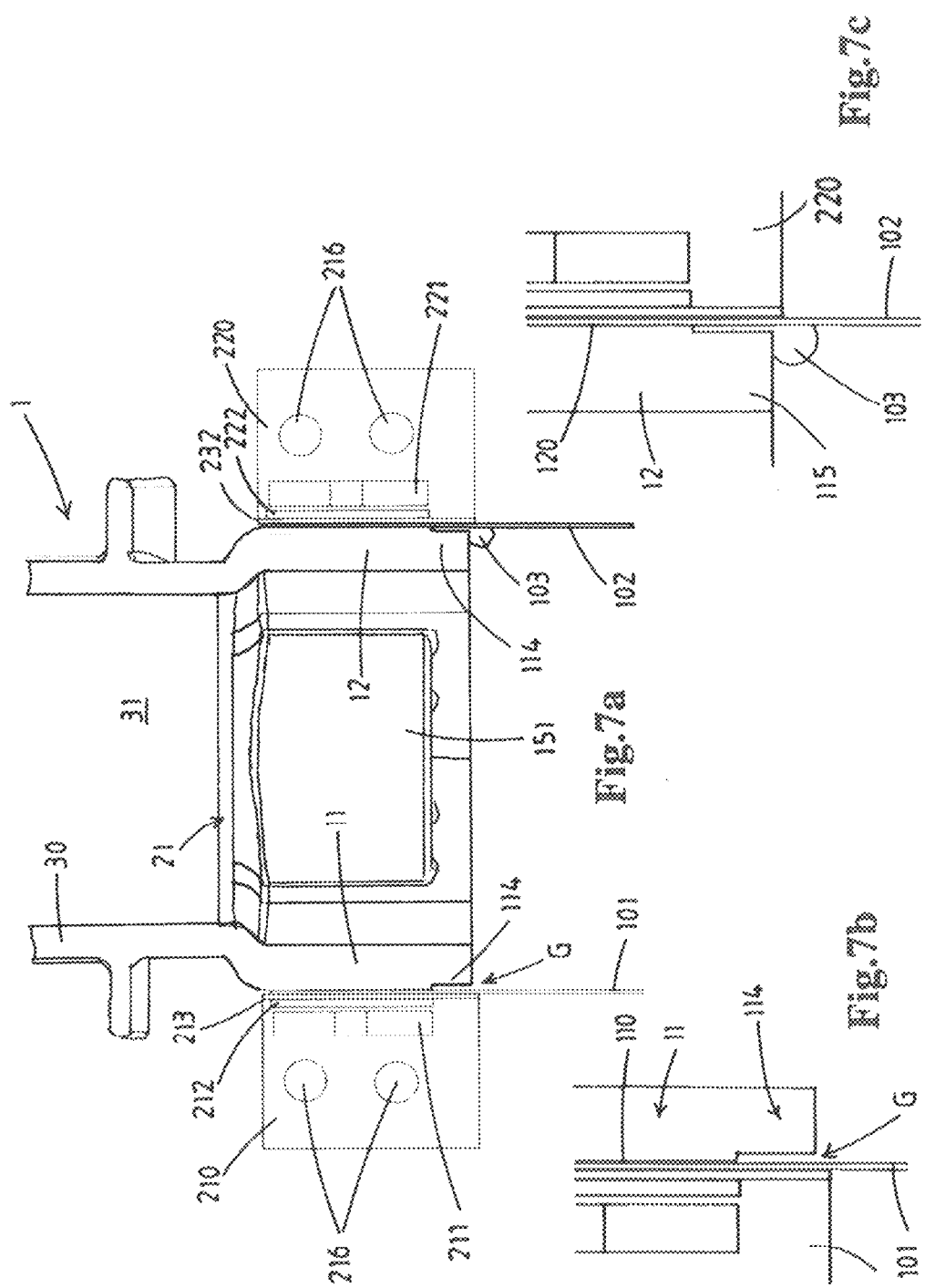

PLASTIC SPOUT AND POUCH PACKAGING

The present invention relates to a spout having a plastic spout body, which is adapted to be heat sealed in a non-bonded region between opposed first and second walls made of heat-sealable film material of a pouch.

The present invention also relates to such a spout combined with a cap and/or a valve to form a closure assembly.

The present invention further relates to a pouch packaging comprising such a spout or closure assembly, to the use of such a spout or closure assembly, and to methods for manufacturing such a pouch packaging.

The document DE202006013587 discloses a spout according to the preamble of claim 1. A further development of this spout is disclosed in US2013/284769 which also corresponds to the preamble of claim 1. In these prior art documents spouts are disclosed that have an attachment portion wherein each of the sealing walls is composed of a first rectilinear portion, a central curved portion, and a second rectilinear portion. The vertical plane of symmetry extends through the first and second pointed ends of the attachment portion. The transverse wall forms a horizontal wall connecting the upper edges of the sealing walls. The attachment portion further comprises a pair of first stabilizing ribs between the second rectilinear portion of the first sealing wall and the first rectilinear portion of the second sealing wall, and a pair of second stabilizing ribs between the first rectilinear portion of the first sealing wall and the second rectilinear portion of the second sealing wall. These stabilizing ribs are, seen in a bottom view onto the spout, rectilinear, i.e. straight, and extend perpendicular to the vertical plane of symmetry.

In the US2013/284769 document, it is discussed that the stabilizing ribs disclosed in the DE202006013587 document cannot cope with the loads exerted on the spout by the jaws during an ultrasonic welding process as breaks occur at the connection points where the stabilizing rib adjoins the sealing walls. Therefore, the US document proposes to have rounded corner transitions between each of the ends of the rectilinear stabilizing rib, where the rib is integral with the respective sealing wall.

Ultrasonic welding of the spout into a pouch is less common than the use of continuously heated sealing jaws for heat sealing the spout into the non-bonded region of the pouch.

In the field of spouted pouch production, it is also known to make use of an impulse heat sealing device, such as offered by ROPEX Industrie-Elektronik GmbH, Bietigheim-Bissingen, Germany. In known embodiments of such an impulse heat sealing device at least one of the jaws has a single, elongated, impulse heatable resistor band that extends along the contoured front surface of the jaw and is covered by a heat-resistant non-stick covering, e.g. a Teflon tape. The device is configured to perform an impulse heat sealing cycle, wherein an actuator device is configured to bring the first and second jaws into the clamped position, with the spout and the two pouch walls of heat sealable film material in between. The sealing device is configured to, in the clamped position, temporarily pass an electric current through the resistor band so as to generate an impulse of heat that is emitted by the resistor band. This brief impulse of heat seals or fuses the pouch walls onto the attachment portion of the spout and, left and right of the spout, seals the two pouch walls onto each other to close the entire seam. The resistor band cools down after termination of the energizing of the resistor band, assisted therein by operation of the associated cooling device. The actuator device is configured to move the first and second jaws into the opened position after the cooling down has been achieved. The temperature of the resistor band may in practical embodiments increase from room temperature or a slightly elevated temperature extremely fast to 200° C. or much higher temperatures like 300° C., 400° C. or even 500° C., so in general very fast to a very high temperature which is maintained only for a very short duration. The impulse sealing approach is, for instance, discussed in DE19737471.

It is an object of the present invention to provide a spout which enhances the quality of the seal that is obtained between the pouch walls and the vertical sealing walls of the spout, and/or enhances the execution of the heat sealing process, e.g. in view of speed, uniformity, etc.

It is an object of the present invention to provide a spout that allows for application of an impulse heat sealing technique to seal the spout between the pouch walls, e.g. to obtain a better quality seal and/or to allow for a shorter duration of the sealing cycle.

It is an object of the present invention to at least to provide an alternative spout.

It is an object of the present invention to provide enhanced heat sealing of spouts into pouches.

According to a first aspect thereof, the present invention provides spout according to claim 1. Herein the attachment portion is embodied such that, seen in a bottom view of the attachment portion, the at least one first stabilizing rib is, between the associated connection points, curved toward the first pointed end, and the at least one second stabilizing rib is, between the associated connection points, curved toward the second pointed end.

Compared to the prior art spouts discussed herein above wherein the stabilizing ribs are straight, the curved stabilizing ribs allow to achieve a desirable balance between strength on the one hand and flexibility on the other hand. As will be explained herein, this design has been found to be particularly advantageous when an impulse heat sealing technique is applied to seal the spout into the pouch.

The curvature in the stabilizing ribs provides that the stiffness when under load of clamping by the sealing jaws is reduced compared to a straight rib, and that the curved ribs provide for an enhanced resilient behaviour under the influence of a clamping by the jaws of the heat sealing device. The improved behaviour allows for the shape of the sealing walls, in particular of the rectilinear portions thereof, to better conform to the complementary shaped front or contact faces of the sealing jaws during clamping, which allows to obtain a better sealing. It is observed that, as is preferred, this enhanced conformity does not require any large clamping force. In fact, as preferred, hardly any clamping force is applied by the jaws in a heat sealing process using the inventive spout designs discussed herein, as the clamping effectively only serve to bring the pouch walls against the outer surfaces. In particular, it is considered that in an impulse heat-sealing process, the clamping force does not form a relevant parameter in the actual sealing process, contrary to common heat sealing wherein continuously heated sealing jaws are applied and the sealing is based on the combination of temperature, time, and clamping pressure as main parameters.

It is observed that the prior art design with the straight stabilizing ribs is prone to non-linear deformations during clamping, for example a buckling deformation, of these ribs. Such buckling is a typical example of a non-linear and unstable deformation, because the stiffness of the straight rib is initially very high, but suddenly drops, thereby resulting in collapsing and sudden deformation of the clamped attachment portion.

The spout according to the first aspect of the present invention, having the gradual and stable deformation of the curved stabilizing ribs when under clamping load, forms a significant improvement which translates into an improved seal quality between the spout and the walls of the pouch.

During clamping by means of the jaws, the first and second stabilizing ribs will become curved or bent to a further extent. As a result of this bending, the connection points of these ribs are subjected to a resultant force vector in the plane of the sealing walls and in a direction away from the respective pointed end, resulting from an overall equilibrium of forces acting on the stabilizing rib. As the at least one first stabilizing rib is bent, its connection points are effectively pressed away from the first pointed end. This resultant force subjects the second rectilinear portion of the first sealing wall and the first rectilinear portion of the second sealing wall to a tensile stress. As the at least one second stabilizing rib is bent, its connection points are pressed away from the second pointed end. This resultant force subjects the second rectilinear portion of the second sealing wall and the first rectilinear portion of the first sealing wall to a tensile stress as well. These tensile stresses in the sealing walls are considered to have the beneficial effect that the rectilinear portions of the sealing walls become elongated and straightened, all of course of a small magnitude, such that an enhanced conformity of the sealing walls to the corresponding parts of the sealing jaws is achieved and thus an improved sealing.

Furthermore, the provision of these curved ribs in between the opposed sealing walls provides for a more evenly distributed mechanical loading of the sealing walls when a, possibly light, clamping load is applied thereon.

The curved shape of the stabilizing ribs is considered of particular advantage when the spout is sealed between the pouch walls by means of impulse heat sealing. Herein, as preferred, the outer sealing surfaces of the sealing walls are smooth outer sealing surfaces in order to obtain a full surface seal or fusion between the outer sealing surface and the pouch wall. So, herein, the outer sealing surfaces are—preferably—devoid of any weld lines, or any other relief thereon; that is devoid of any relief that might result in an entrapment of air between the pouch wall and the outer sealing surface of the sealing wall, even when a very light clamping force is applied by the sealing jaws, as is preferred. The above-described behaviour of the spout due to the curved ribs contributes to avoiding entrapped air. Entrapped air is observed to affect the heat transfer during impulse heat-sealing in undesirable manner. Instead of countering air entrapment by a high clamping force, it proposed as an embodiment that for impulse heat sealing of the spouts discussed herein no significant clamping force is applied. It has been observed that to enable a high quality seal between the spout and the pouch walls, it is rather important to obtain a full surface contact between the sealing jaws of the impulse heat sealing device and the spout, with the pouch walls therein between, in order to transfer the heat impulse evenly across the sealing surface of the spout. The known spouts having straight stabilizing ribs, as described above, are considered to be locally too rigid to obtain the desired conformity to the shape of the sealing jaw, giving rise to insufficient sealing quality.

In a practical embodiment, as in the mentioned prior art, each of the stabilizing ribs depends from the transverse wall, to which it is integral, downward in vertical direction. For example, the spout is manufactured as a single piece by means of an injection-moulding manufacturing process.

In a practical embodiment, the attachment portion has a second vertical plane of symmetry, perpendicular to the plane of symmetry through the pointed ends and through a center of the opening in the transverse wall.

In an embodiment, the at least one first stabilizing rib comprises or consists of:
 an inner first stabilizing rib, disposed adjacent to the passage,
 an outer first stabilizing rib, disposed closer to the first pointed end, and
wherein the at least one second stabilizing rib comprises or consists of:
 an inner second stabilizing rib, disposed adjacent to the passage,
 an outer second stabilizing rib, disposed closer to the second pointed end.

In a practical embodiment, the spout has a pair of first inner and outer stabilizing ribs and a pair of second inner and outer stabilizing ribs. The provision of two curved stabilizing ribs between opposed rectilinear portions allows to provide a resilient stabilization of the rectilinear portions whilst clamped and enhanced uniformity of the contact between the outer sealing surfaces and the pouch walls.

For a larger spout, one could envisage three or four first stabilizing ribs and three or four second stabilizing ribs.

In an embodiment, at least one first stabilizing rib, e.g. the inner first stabilizing rib, and at least one second stabilizing rib, e.g. the inner second stabilizing rib, are arranged in proximity of the opening in the transverse wall and are connected to the rectilinear portions in proximity of the join to the respective central curved portion of the sealing wall. Under influence of the, preferably light, clamping force of the jaws during the sealing cycle, this arrangement results in a tensile stress in the rectilinear portion between the pointed end and the location of the connection between the stabilizing rib and the rectilinear portion. This causes a straightening of the clamped rectilinear portion, enhancing sealing quality, e.g. avoiding non-uniform contact between the rectilinear portion and the pouch wall.

In an embodiment, a radius of curvature of the at least one first stabilizing rib, e.g. of each first stabilizing rib, and of the at least one second stabilizing rib, e.g. of each second stabilizing rib, is larger than a radius of a circular opening in the transverse wall. The benefit of a relatively large radius of curvature is that the curved stabilizing ribs provide a desirable combination of flexibility and strength to absorb the clamping forces applied on the attachment portion by sealing jaws during heat sealing.

In a further embodiment, the attachment portion of the spout comprises a first connecting rib, which extends between the outer first stabilizing rib and the inner first stabilizing rib, and a second connecting rib, which extends between the outer second stabilizing rib and the inner second stabilizing rib, wherein the first connecting rib and the second connecting rib each extend in the plane through the first pointed end and the second pointed end. These connecting ribs form a coupling between the respective inner and outer stabilizing ribs and cause the stabilizing ribs to act as a resilient whole when under load of the clamping by the sealing jaws. The provision of the connecting ribs further contributes in enhancing uniformity of contact between the rectilinear portions and the pouch walls. As preferred, the connecting ribs do not extend between the outer stabilizing rib and the neighbouring pointed end.

The tubular neck extends upward from the transverse wall and does not extend downward in between the sealing walls. As a result of the tubular neck not projecting below the transverse wall, no undue 'dead zones' are present, in which otherwise substance would remain as a result of not being able to be emptied.

In an embodiment, the spout is made of a plastic mono-material, for example a polyolefin material, such as polyethylene (PE) or polypropylene (PP).

In an embodiment, the outer sealing surface of the first sealing wall and of the second sealing wall are smooth outer sealing surfaces.

In an embodiment, the outer sealing surface of the first sealing wall and of the second sealing wall are smooth outer sealing surfaces and these outer sealing surfaces are each bordered by an inwardly-recessed bottom edge of the sealing wall.

The inwardly-recessed bottom edge extends over a minor portion of the height of the sealing walls.

The bottom edge has a vertical face that is stepped inward from the smooth outer sealing surfaces of the sealing walls.

The inwardly-recessed bottom edges of the sealing walls provide that, when the spout together with the pouch walls is clamped between sealing jaws during a sealing cycle, an open bottomed groove is initially present at the bottom edge of the sealing walls of the spout, between the inwardly-recessed bottom edge and the pouch wall. No clamping force is applied at the height of this groove, since the respective vertical face of the recess is spaced from the pouch wall. When the heat is applied during the sealing cycle, e.g. in an impulse heat sealing process, the smooth outer sealing surfaces of the sealing walls and the pouch walls are locally melted and fused together as a result of the applied heat. As a result of the melting of the contacting areas of the spout and pouch walls, some of the molten plastic material will seek to flow away, e.g. under the influence of the applied clamping force, and will flow into the groove initially formed by the inwardly-recessed bottom edge of the sealing wall.

It is noted that the smooth design of the outer sealing surfaces, enhances this flow towards the inwardly-recessed bottom edge and also does not provide other locations where the molten material seeking to flow away could be collected. As preferred, the front surfaces of the jaws of the sealing device are equally smooth.

It is observed that, with a properly dimensioned inwardly-recessed bottom edge, this flow of molten material will fill-up the recess or groove at the bottom edge of the sealing walls and will even, as preferred, when solidified form a bead of plastic material protruding below bottom edge of the sealing walls, the bead being fused to the pouch wall and to the bottom edge. It is observed that this bead or weld fillet, preferably extending all around the lower periphery of the sealing walls, provides for improved mechanical properties of the seal between the spout and the pouch walls. In particular, the bead allows to enhance the ability to resist sudden shock loads acting on the seal that could result from sudden increase in pressure inside the pouch, for example when a filled pouch accidentally falls and/or is subjected to a drop test.

In embodiments, the sealing walls have a height of about 6 mm.

For impulse heat sealing of the spout, the smooth outer sealing surfaces of the sealing walls are particularly advantageous. Such impulse heat sealing is done so that these smooth outer sealing surfaces and pouch walls are, preferably lightly, clamped by the jaws and then a brief impulse of heat is created that is transmitted from the front face of the sealing jaws, through the heat sealable film-material pouch walls, to the interface of the pouch wall and the smooth outer sealing surface. Due to the full surface contact between the outer sealing surface and the pouch wall, and preferably also between the front or contact surface of the sealing jaw and the pouch wall, the presence of entrapped air, even in very small volumes, in this heat transfer path is avoided which would otherwise impair the uniformity of impulse type heat transfer. As explained, the structure of the attachment portion contributes to this effect. Also, in the impulse sealing process, a cooling is effected after the heat impulse, yet prior to opening sealing jaws of the sealing device. The provision of smooth outer sealing surfaces enables enhanced conduction of heat from the spout towards cooling features in the sealing jaw (e.g. cooling liquid passed through one or more coolant channels of the sealing jaws), in order to ensure that the spout and the obtained weld with the pouch is cooled rapidly. In the absence of smooth outer sealing surfaces, for example when the outer sealing surfaces would comprise protruding weld lines as explained in US2013/284769, minute air pockets are present in between the pouch wall and the sealing wall of the pouch, which acts as an insulator for the conduction of heat and which also reduces the rate at which the spout can be cooled after sealing.

In an embodiment, the inwardly-recessed bottom edge extends in the vertical direction over minor portion of the height of the sealing walls, for example between 5% and 20% of the height of the sealing walls. In practical embodiments, the height of the inwardly-recessed bottom edge may lie between 0.5 mm and 2 mm, for example 1 mm, whereas an overall height of the attachment portion may be in between 5 mm and 20 mm, for example being 6 mm. Seen in the vertical direction, the inwardly-recessed bottom thus only spans over a minor portion of the height, for example being in between 5% and 20% thereof. Accordingly, the remainder of the height of the sealing walls, for example in between 80% and 95%, is occupied by the smooth outer sealing surface that is to be sealed to the pouch wall.

In an embodiment, seen in side view, a straight lined step defines the transition between the outer sealing surface and the inwardly-recessed bottom edge. In an alternative embodiment, the transition is not straight-lined in side view. For example, the step forming the transition is undulating or wavy in side view. A non-straight embodiment of the step transition may be sought, for example, in view of avoiding undue local shrinkage of the pouch wall in said zone. Equally, the lower contour of the inwardly-recessed bottom edge can be straight-lined, often referred to as horizontal, or alternatively be undulating or wavy.

In an embodiment, each of the sealing walls is downwardly extended by a pouch wall spacer portion, which each are located below the inwardly-recessed bottom edge of the respective sealing wall. The pouch wall spacer portions form a continuation of the respective inwardly-recessed bottom edges, e.g. a downward continuation in a direction facing away from the transverse wall of the spout. The pouch wall spacer portions are integrally connected to the respective inwardly-recessed bottom edges.

The pouch wall spacer portions of the sealing walls are configured to prevent the pouch walls from deforming inwardly. Such deformation may occur during emptying of the pouch provided with the spout. Yet, such deformation may also occur by local shrinkage in the process of sealing of the spout in between the pouch walls. In that process, the pouch wall spacer portions become located in between the pouch walls and in a zone below the sealing jaws when those are in their clamped positions, e.g. during the induction impulse sealing and the clamped cooling phase. The pouch walls are not clamped on these portions during the sealing process.

The pouch wall spacer portions can prevent local inward deformation of the pouch walls, where otherwise no parts of the spout are located. Such deformations could be the result of local shrinkage of the foil of the pouch walls and/or when the bead in between the inwardly recessed bottom edges of the spout and the pouch walls would undergo cooling at a rate different from the cooling rate of the pouch walls and/or the spout themselves. As these pouch wall spacer portions avoid these deformations, the pouch may have fewer, or even no wrinkles in said zone after sealing and the pouch walls may extend straight, e.g. in a vertical plane.

A thickness of the pouch wall spacer portions may substantially correspond to the thickness of the inwardly-recessed bottom edges, e.g. at least in a region adjacent the inwardly-recessed bottom edges.

The pouch wall spacer portions, e.g. lower parts thereof, may have an outer surface that gradually tapers inwardly in a downward direction. Hence, outer surfaces of these lower parts may gradually taper inwardly, whereas inner surfaces of these lower parts may be substantially straight. Alternatively, the thickness of the lower parts of the pouch wall spacer portions may gradually reduce because their inner surfaces gradually taper outwardly and because their outer surfaces are substantially straight. The thicknesses of bottom parts of the pouch wall spacer portions can be made smaller than that of the top parts, since they may have a smaller contribution to the preventing of the flexing of the pouch walls. In this way, less plastic can be used for the spout, whilst still having good properties, e.g. in preventing flexing of the pouch walls.

The pouch wall spacer portions may be mainly located underneath the central curved portion of the respective sealing wall. Underneath the central curved portion, the lower contour of the pouch wall spacer portion may have a curved shape, e.g. seen in a horizontal direction, and may have a height that is similar to the height of the nominal portion of the respective sealing wall. Underneath the rectilinear portions, e.g. adjacent the central curved portion, the lower contour of the pouch wall spacer portions may curve upward to merge with the inwardly-recessed bottom edges.

Alternatively, the pouch wall spacer portions may extend across the entire bottom periphery of the sealing walls and may have a straight, e.g. horizontal lower contour. The pouch wall spacer portions are then present underneath the first rectilinear portions, the central curved portions and the second rectilinear portions. The pouch wall spacer portions may then be configured to prevent the pouch walls from deforming inwardly along the entire bottom periphery of the sealing walls during sealing of the spout in between the pouch walls. With these straight pouch wall spacer portions, it may be effected that even larger portions the pouch walls may remain more straight after sealing.

The height of these straight pouch wall spacer portions may be substantially constant along the entire width of the attachment portion. However, at one side of the attachment portion, e.g. at a first pointed end thereof, the lower contour of the pouch wall spacer portions may be curved upward slightly, so that the height of the pouch wall spacer portions is somewhat smaller here. At this elevated portion, the spout may comprises its injection point where plastic material has been injected in the mould during an injection-moulding manufacturing process.

In an embodiment, a section of the sealing walls above the inwardly-recessed bottom edge is defined as a nominal section of the sealing walls. The sealing walls have a thickness at the inwardly-recessed bottom edge that is smaller than a nominal thickness of the nominal section of the sealing walls. According to this embodiment, as preferred, the sealing walls are thus thinner at the inwardly-recessed bottom edge than in the nominal section of the sealing walls. The inwardly-recessed bottom edge does not bear loads resulting from the clamping force, but is rather configured to receive a flow of some molten plastic during the sealing and to be filled by that flow, preferably so as to form a bead below the bottom edge as discussed herein. At the inwardly-recessed bottom edges, the sealing walls may be thin in order to save weight for the spout and to reduce the amount of plastic that is required for forming the spout.

In an embodiment, the nominal thickness of the nominal sections of the sealing walls may be in between 1 mm and 2 mm, for example 1.5 mm, wherein the inwardly-recessed bottom edge may have a face that is offset inward between 0.05 mm and 0.2 mm, for example 0.1 mm, relative to the outer faces of the nominal thickness sections of the sealing walls.

In an embodiment the sealing walls may have a nominal thickness between 0.8 mm and 2.2 mm.

In an embodiment, the stabilizing ribs do not project downward beyond the nominal section of the sealing walls. For example, these ribs have a height that corresponds to the height of the nominal section of the sealing walls.

As preferred, the stabilizing ribs are only directly connected to the inside of the nominal sections of the sealing walls and are not directly connected to the inwardly-recessed bottom edge. This may be particularly advantageous due to the fact that only the nominal section of the sealing walls is subject to the clamping forces, as is described above.

Now the second aspect of the invention will be discussed, which has already been discussed above in the context of an embodiment of the spout according to the first aspect of the invention.

The second aspect of the invention also seeks to provide a spout which enhances the quality of the seal that is obtained between the pouch walls and the vertical sealing walls of the spout, and/or enhances the execution of the heat sealing process.

It is an object of the second aspect of the present invention to provide a spout that allows for application of an impulse heat sealing technique to seal the spout between the pouch walls, e.g. to obtain a better quality seal and/or to allow for a shorter duration of the sealing cycle.

It has been observed that spouts embodied, for instance, as disclosed in DE202006013587 and in US2013/284769, are not ideally suited for the impulse heat sealing technique and/or do not provide an optimal seal quality.

According to a second aspect, the present invention provides a spout according to the preamble of claim 10, based on US2013/284769, which is characterized in that the outer sealing surfaces of the first sealing wall and of the second sealing wall are smooth, and in that the outer sealing surfaces of the first sealing wall and of the second sealing wall are each bordered by an inwardly-recessed bottom edge of the respective sealing wall.

So, the second aspect envisages the presence of smooth outer sealing surfaces in combination with these surfaces being bordered, along their lower perimeter, by an inwardly-recessed bottom edge, yet possibly without the presence of any stabilizing ribs, or possibly with one or more stabilizing ribs between the opposed rectilinear portions of the attachment portion, yet not necessarily stabilizing ribs embodied according to the first aspect of the invention.

As already explained above, the inwardly-recessed bottom edges of the sealing walls provide that, when the spout together with the pouch walls is clamped, preferably lightly, between sealing jaws during a sealing cycle, an open bottomed groove is initially present at the bottom edge of the sealing walls of the spout, between the inwardly-recessed bottom edge and the pouch wall. No noticeable clamping force is applied at the height of this groove, since the respective vertical face of the recess is spaced from the pouch wall. When the heat is applied during the sealing cycle, e.g. in an impulse heat sealing process, the smooth outer sealing surfaces of the sealing walls and the pouch walls are locally melted and fused together as a result of the applied heat. As a result of the melting of the contacting surfaces of the spout and pouch walls, some of the molten plastic material will seek to flow away under the influence of the applied clamping force and will flow into the groove initially formed by the inwardly-recessed bottom edge.

It is noted that the smooth design of the outer sealing surfaces, enhances this flow towards the bottom edge and also does not provide other locations where the molten material could be collected. As preferred, the front or contact surface of the jaws of the sealing device are equally smooth.

It is observed that, with a properly dimensioned inwardly-recessed bottom edge, this flow of molten material will fill-up the recess or groove at the bottom edge of the sealing walls and will even, as preferred, when solidified form a bead of plastic material protruding below bottom edge of the sealing walls, the bead being joined to the pouch wall and to the bottom edge. It is observed that this bead, preferably extending all around the lower periphery of the sealing walls, may provide for improved mechanical properties of the seal between the spout and the pouch walls. In particular, the bead allows to enhance the ability to resist sudden shock loads acting on the seal that could result from sudden increase in pressure inside the pouch, for example when a filled pouch accidentally falls and/or is subjected to a drop test.

In an embodiment, seen in side view, a straight lined step defines the transition between the outer sealing surface and the inwardly-recessed bottom edge. In an alternative embodiment, the transition is not straight-lined in side view. For example, the step forming the transition is undulating or wavy in side view. A non-straight embodiment of the step transition may be sought, for example, in view of avoiding undue local shrinkage of the pouch wall in said zone. Equally, the lower contour of the inwardly-recessed bottom edge can be straight-lined, often referred to as horizontal, or alternatively be undulating or wavy.

In an embodiment, each of the sealing walls is downwardly extended by a pouch wall spacer portion, which each are located below the inwardly-recessed bottom edge of the respective sealing wall. The pouch wall spacer portions form a continuation of the respective inwardly-recessed bottom edges, e.g. a downward continuation in a direction facing away from the transverse wall of the spout. The pouch wall spacer portions are integrally connected to the respective inwardly-recessed bottom edges.

The pouch wall spacer portions of the sealing walls are configured to prevent the pouch walls from deforming inwardly. Such deformation may occur during emptying of the pouch provided with the spout. Yet, such deformation may also occur by local shrinkage in the process of sealing of the spout in between the pouch walls. In that process, the pouch wall spacer portions become located in between the pouch walls and in a zone below the sealing jaws when those are in their clamped positions, e.g. during the induction impulse sealing and the clamped cooling phase. The pouch walls are not clamped on these portions during the sealing process.

The pouch wall spacer portions can prevent local inward deformation of the pouch walls, where otherwise no parts of the spout are located. Such deformations could be the result of local shrinkage of the foil of the pouch walls and/or when the bead in between the inwardly recessed bottom edges of the spout and the pouch walls would undergo cooling at a rate different from the cooling rate of the pouch walls and/or the spout themselves. As these pouch wall spacer portions avoid these deformations, the pouch may have fewer, or even no wrinkles in said zone after sealing and the pouch walls may extend straight, e.g. in a vertical plane.

A thickness of the pouch wall spacer portions may substantially correspond to the thickness of the inwardly-recessed bottom edges, e.g. at least in a region adjacent the inwardly-recessed bottom edges.

The pouch wall spacer portions, e.g. lower parts thereof, may have an outer surface that gradually tapers inwardly in a downward direction. Hence, outer surfaces of these lower parts may gradually taper inwardly, whereas inner surfaces of these lower parts may be substantially straight. Alternatively, the thickness of the lower parts of the pouch wall spacer portions may gradually reduce because their inner surfaces gradually taper outwardly and because their outer surfaces are substantially straight. The thicknesses of bottom parts of the pouch wall spacer portions can be made smaller than that of the top parts, since they may have a smaller contribution to the preventing of the flexing of the pouch walls. In this way, less plastic can be used for the spout, whilst still having good properties, e.g. in preventing flexing of the pouch walls.

The pouch wall spacer portions may be mainly located underneath the central curved portion of the respective sealing wall. Underneath the central curved portion, the lower contour of the pouch wall spacer portion may have a curved shape, e.g. seen in a horizontal direction, and may have a height that is similar to the height of the nominal portion of the respective sealing wall. Underneath the rectilinear portions, e.g. adjacent the central curved portion, the lower contour of the pouch wall spacer portions may curve upward to merge with the inwardly-recessed bottom edges.

Alternatively, the pouch wall spacer portions may extend across the entire bottom periphery of the sealing walls and may have a straight, e.g. horizontal lower contour. The pouch wall spacer portions are then present underneath the first rectilinear portions, the central curved portions and the second rectilinear portions. The pouch wall spacer portions may then be configured to prevent the pouch walls from deforming inwardly along the entire bottom periphery of the sealing walls during sealing of the spout in between the pouch walls. With these straight pouch wall spacer portions, it may be effected that even larger portions the pouch walls may remain more straight after sealing.

The height of these straight pouch wall spacer portions may be substantially constant along the entire width of the attachment portion. However, at one side of the attachment portion, e.g. at a first pointed end thereof, the lower contour of the pouch wall spacer portions may be curved upward slightly, so that the height of the pouch wall spacer portions is somewhat smaller here. At this elevated portion, the spout may comprises its injection point where plastic material has been injected in the mould during an injection-moulding manufacturing process.

Further advantageous embodiments of the spout according to the second aspect of the invention are mentioned in the subclaims, and/or are discussed herein in the context of the first aspect of the invention.

The second aspect also relates to a spout adapted to be heat sealed in a non-bonded region between opposed first and second walls of a pouch, comprising a plastic spout body that has a passage for filling the pouch with a substance and/or for discharging a substance from the pouch, wherein the spout body comprises:
- an attachment portion having a vertical first plane of symmetry with a vertical first sealing wall and an opposed vertical second sealing wall, which sealing walls each have an upper edge and a bottom edge remote from the upper edge,
- wherein each sealing wall has an outer sealing surface, wherein the outer sealing surfaces of the sealing walls are to be heat sealed to a respective one of the pouch walls,
- a tubular neck having a bore that which tubular neck is integral with and extends upwards from the attachment portion, which tubular neck forms at least a portion of the passage, characterized in that
- the outer sealing surface of the first sealing wall and the outer sealing surface of the second sealing wall is smooth,
- and in that the outer sealing surfaces of the first sealing wall and of the second sealing wall are each bordered by an inwardly-recessed bottom edge of the sealing wall.

It will be appreciated that the measures according to the first aspect of the invention and according to the second aspect of the invention can be readily combined, e.g. in an embodiment of a spout that is optimal for application of impulse heat sealing, e.g. induction based impulse heat sealing, of the spout in a non-bonded region between opposed walls of a pouch.

The present invention further provides a closure assembly comprising a spout as described herein and a closure device mounted to the neck of the spout, e.g. a cap and/or a valve, e.g. a self-closing valve. For example, the cap is a screw cap, a quarter-turn cap, a flip-top cap.

The present invention also relates to a pouch packaging configured to contain, or containing, a substance, comprising:
- a collapsible pouch comprising opposed first and second walls made of a heat-sealable film material, defining an interior of the pouch in between the walls, and
- a spout as described herein, wherein the spout has been positioned, with its attachment portion, in a non-bonded edge region between the opposed first and second walls of the pouch, wherein the first pouch wall has been heat sealed to the outer sealing surface of the first sealing wall of the attachment portion, and wherein the second pouch wall has been heat sealed to the outer sealing surface of the second sealing wall of the attachment portion.

In an embodiment of the pouch packaging a spout according to second aspect of the invention, a groove initially, so prior to fusing, defined by the inwardly-recessed bottom edge of the sealing walls is filled with solidified molten plastic material. More preferably, e.g. in view of strength in a drop test of a filled pouch, a bead of solidified molten plastic material is present under the filled groove initially formed by the inwardly-recessed bottom edge of the sealing walls, which bead is joined to the bottom edge and to the respective pouch wall.

In an embodiment, the heat-sealable film material of the pouch walls is devoid of a metal layer therein. This embodiment, is favoured in combination with the first and/or second aspect of the invention, as sealing can be done at low clamping force so that the metal layer, which commonly provides strength in the pouch wall to avoid damage due to said clamping force is no longer required. This applies in particular to the use of the impulse heat sealing process.

In an embodiment, the heat-sealable film material of the pouch walls is a plastic mono-material, for example of a polyolefin material, for example, polyethylene (PE), preferably linear low-density polyethylene (LLDPE), or polypropylene (PP), or polyethylene terephthalate (PET). According to this embodiment, the film material is made entirely from a single type of polymer. The use of only a single polymer may improve the recyclability of the pouch. The film material may comprises multiple layers of the same polyolefin material, e.g. with slightly different properties due to treatments to which the layers have been subjected and/or slight variations of the composition.

In an embodiment, the spout body is made from the same plastic material as the plastic mono-material of the film of the pouch walls, for example both consisting of a polyolefin material, for example polyethylene (PE) or polypropylene (PP). With the spout being injection moulded from the same polymer as the walls of the pouch, the recycling of the packaging is further enhanced.

The present invention further provides the use of the spout as described herein in a pouch for forming a passage for filling the pouch with a substance and/or for discharging a substance from the pouch.

The present invention further relates to a method for manufacturing a pouch packaging configured to contain a substance, or containing a substance, the method comprising the steps of:
- positioning a spout as described herein with the attachment portion thereof in a non-bonded edge region between opposed first and second walls of the pouch, which pouch walls are made of heat-sealable film material, preferably plastic mono-material film material,
- heat sealing the pouch walls onto the outer sealing surfaces of the sealing walls of the spout using a heat sealing device comprising a first jaw and a second jaw, wherein the heat sealing comprises clamping the first pouch wall with the first jaw of a sealing device onto the outer sealing surface of the first sealing wall, and clamping the second pouch wall with the second jaw onto the outer sealing surface of the second sealing wall, wherein the heat sealing device is operated to provide heat from each of the jaws so as to heat seal the pouch walls onto the outer sealing surfaces of the sealing walls.

In a preferred embodiment, the heat sealing involves an impulse heat sealing cycle, in which cycle:
- initially the first jaw and the second jaw are in an opened position thereof, spaced from the non-bonded region of the pouch in which the spout has been inserted with its attachment portion,
- upon operation of an actuator system the first jaw and second jaw are moved into contact with the respective pouch wall and into a clamped position, so that said pouch walls are clamped, lightly as preferred, onto the outer sealing surface of the first and second sealing wall respectively,
- a heat impulse is generated that is emitted from each of the first and the second jaw, which heat impulses cause the pouch walls and outer sealing surfaces of the spout to be fused with each other, after termination of the heat impulse generation, the jaws remain in the clamped positions and a cooling of the spout and pouch walls is effected, preferably as cooling liquid is being circulated through ducts in the jaws, preferably this circulation of cooling liquid being continued during all steps of the impulse heat sealing cycle, after said cooling, the first jaw and the second jaw are moved away from each other, into the opened position, for example allowing the pouch with spout to be moved to another processing station, e.g. for filling and/or capping.

In an embodiment, the spout is embodied according to the first aspect of the invention, wherein the clamping by means of the first jaw and the second jaw of the heat sealing device causes a bending of the stabilizing ribs.

In an embodiment, the spout is embodied according to the second aspect of the invention, wherein the inwardly-recessed bottom edges of the sealing walls provide that, when the spout together with the pouch walls is clamped between the first and second jaws, an open bottomed groove is initially present at the bottom edge of the sealing walls of the spout, between the inwardly-recessed bottom edge and the pouch wall, and wherein, when the heat impulses are generated, the outer sealing surfaces of the sealing walls and the pouch walls are locally melted and fused together, wherein, as a result of the melting of the contacting surfaces of the spout and pouch walls, some of the molten plastic material flows away and into said groove initially formed by the inwardly-recessed bottom edge, wherein this flow of molten material fills up said groove initially formed by the inwardly-recessed bottom edge, wherein, preferably, said flow of molten material also forms, when solidified, a bead of plastic material protruding below bottom edge of the sealing walls, the bead being joined to the pouch wall and to the bottom edge.

In an embodiment, the first and second jaws each comprise:

a recessed contact face portion defining a recess that is shaped complementary to a half of the attachment portion of the spout that is received therein, preferably, said recessed contact face portion including rectilinear face portions and a central curved face portion of the recess to match the shape of the attachment portion, wherein the first and second pouch walls are, in the clamped position of the first and second jaws, clamped against the sealing walls of the attachment portion by means of the recessed portion, and coplanar face portions on opposite sides of the respective recessed face portion and adjoining said recessed face portion, wherein the first and second pouch walls are, in the clamped positions of the first and second jaws, clamped against one another by means of the coplanar face portions.

In an embodiment, use is made of an impulse heat sealing device, wherein each of the first and second jaws comprises:

at least one susceptor element comprising electrically conductive material, which extends along a recessed face portion and coplanar face portions of the contact face of the jaw and which is covered by a heat-resistant non-stick covering for contacting the first and second pouch walls in the clamped position of the first and second jaws, an inductor which is electrically insulated from the respective susceptor element, wherein the inductor, preferably, comprises an elongated inductor section that extends along a rear side of the respective at least one susceptor element, wherein the sealing device is configured and operated to perform a sealing cycle, wherein—with the first and second jaws in the clamped positions thereof—a high frequency electric current source of the impulse sealing device is operated to temporarily feed a high frequency electric current to the inductor of each jaw, thereby generating a high frequency electromagnetic field with the inductors, thereby inducing eddy currents in the respective susceptor element with the high frequency electromagnetic field and generating an impulse of heat that is emitted by the susceptor element, which impulses of heat seal the first and second walls to the outer sealing surfaces of the attachment portion of the spout and to each other on opposite sides of the attachment portion. A cooling, after termination of the high frequency electromagnetic field, is performed, e.g. by cooling liquid circulating through one or more ducts in the jaws, whilst the jaws remain in the clamped position.

Induction based impulse heat sealing of a spout is, preferably, done with a spout having an attachment portion with sealing walls having smooth outer sealing surfaces.

Induction based impulse heat sealing is based on generating a high frequency electromagnetic field with an inductor associated with each of the jaws of the sealing device, wherein the electromagnetic field induces eddy currents in a respective susceptor element of the jaw, thereby generating an impulse of heat that is emitted by the susceptor element.

In an embodiment at least one elongated inductor section of the inductor extends at a rear side of at least one susceptor element of the jaw, preferably in close proximity to said rear side, which susceptor element extends along a contoured contact face of the jaw. This provides that the development of heat over the extension of the front of the jaw takes place in an attractive manner, in particular in a rather uniform manner. The elongation of the inductor section contributes to the homogeneity of the current density within the inductor section, e.g. compared to a coiled or another rather irregular shape of an inductor section. This homogeneity translates into homogeneity of the high frequency field, and thereby to homogeneity of the impulse heating of the susceptor element. The latter contributes to a reliable and effective heat sealing. The homogeneity of the heat sealing and the impulse process allow to have a relatively low clamping force, that may effectively only serve to assure an intimate surface contact between the pouch walls and the attachment portion, e.g. so as to exclude any presence of pockets of air between the surfaces to be joined by the heat sealing.

In embodiments, the at least one elongated inductor section is a solid cross-section metal or other, preferably high conductivity material inductor section, e.g. made of copper which is preferred. This arrangement allows to avoid undue variations of current density within the inductor section, and thereby undesirable variation in the generated field, e.g. compared to an internally hollow inductor section. In alternative embodiment, the at least one elongated inductor section is a multi-strand Litz wire. It has been observed that in such embodiment, heating of the Litz-wire may become problematic and cooling is difficult.

In embodiments, the at least one elongated inductor section has a constant cross-section, preferably a solid cross-section, over its length along the contoured front surface of the respective jaw. This design avoids undue variations of current density within the inductor section, which might otherwise occur at locations where the cross-section changes, and thereby undesirable variation in the generated field.

In embodiments, the uniform cross-section elongated inductor section has, seen in a top view onto the jaw, a shape corresponding to the contoured front surface of the jaw and maintains a uniform distance between the susceptor element and the elongated inductor section. This arrangement enhances uniformity of the development of heat in the susceptor element.

In embodiments, the inductor of a jaw comprises multiple elongated inductor sections that are parallel to one another.

In embodiments, the inductor of a jaw comprises multiple elongated inductor sections that extend horizontally and are parallel to one another and are vertically spaced from one another by a horizontal slit, e.g. an air slit or a slit filled with electrically insulating material. In embodiments, there is just one pair of elongated inductor sections that are parallel to one another and vertically spaced from one another by a horizontal slit arranged in proximity of the rear side of the susceptor element.

In embodiments, said slit between neighbouring inductor sections that are arranged above one another has a height between 0.01 and 5 mm, more preferably between 0.1 and 2 mm.

In an embodiment, the inductor of a jaw comprises a pair of parallel inductor sections arranged at the rear side of the susceptor element, the one inductor section above the other inductor section, spaced from one another by an elongated slit, e.g. an air slit or a slit filled with electrically insulating material. In practical embodiments, there is just one pair of inductor section above one another in the jaw.

The presence of the slit between the parallel elongated inductor sections allows for a desirable concentration of the field that is generated by the inductor of the jaw. In an embodiment the susceptor element extends, seen in a view onto the front surface of the jaw, over a horizontal slit between parallel inductor sections.

In an embodiment, the susceptor element, seen in a view onto the front of the jaw, extends over the slit between parallel elongated inductor sections and overlaps in said view with each of the parallel inductor sections.

In an embodiment, the susceptor element is embodied as one strip that extends over the slit between parallel elongated inductor sections and overlaps in said view with each of the parallel inductor section.

In an embodiment, a strip shaped susceptor element has an upper edge and a lower edge defining a height of the strip, preferably said height corresponding to the height of the outer sealing surface of the attachment portion of the spout.

Preferably, the height of the strip is at least 50% of the height of the single pair of inductor sections including the slit that are arranged at the rear of the strip above one another, e.g. between 75% and 125% of said height, e.g. about 100% of said height.

In an embodiment, a strip shaped susceptor element has an upper edge and a lower edge defining a height of the strip, wherein the inductor of a jaw comprises a number of, e.g. multiple, inductor sections that each extend along the rear side of the susceptor element. Herein the height of the strip is preferably at most the same as the height of the number of one or more inductor sections, preferably the upper edge and the lower edge of the strip not protruding above and below the height of the one or more inductor sections.

In an embodiment, the inductor of a jaw is embodied so that in a pair of adjacent and parallel inductor sections that are arranged at the rear side of the susceptor element, the current flows in the same direction through the inductor sections.

In an embodiment, the inductor of a jaw is embodied so that in a pair of adjacent and parallel inductor sections arranged at the rear side of the susceptor element, the current flows in opposite directions through the inductor sections.

In an embodiment, the inductor of a jaw comprises a C-shaped inductor element having parallel first and second inductor sections interconnected, e.g. by a bent portion, in series, wherein the free ends of the inductor sections have terminals for electrical connection to the current source.

In an embodiment, the first and/or second jaw is provided with one C-shaped inductor element, having parallel horizontal first and second elongated inductor sections above one another and interconnected in series, wherein the free ends of the inductor sections have terminals for electrical connection to the current source.

In an embodiment, the inductor of a jaw comprises a C-shaped inductor element having parallel first and second inductor sections interconnected in series and arranged above one another, wherein the inductor sections are separated by a horizontal slit, e.g. an air slit or a slit filled with electrically insulation material.

In an embodiment, the inductor of a jaw comprises multiple, e.g. just two, elongated inductor sections arranged parallel to one another and arranged above one another behind the susceptor element.

In an embodiment, the susceptor element has a height and the inductor of a jaw comprises multiple inductor sections arranged parallel to one another and arranged above one another behind the susceptor element.

In an embodiment, the inductor of a jaw has an inductor element that is generally U-shaped seen from above, wherein each of the first and second elongated inductor sections thereof has a constant cross-section, preferably a solid cross-section, over its length and wherein each of said first and second inductor sections has a shape corresponding to the contoured front surface of the respective jaw when seen in said view from above.

In an embodiment, the at least one elongated inductor section has a thickness of between 1.0 and 4.0 mm, seen perpendicular to the front surface of the jaw, for example between 1.5 and 3.0 mm. The limited thickness of the inductor element enhances the cooling of the jaw, including the conductor of the jaw, e.g. as one or more cooling fluid ducts are preferably arranged in proximity of a rear side of the at least one inductor element.

In an embodiment, the at least one elongated inductor section has a rectangular cross-section with a height that is greater than the thickness of the inductor section. This arrangement allows to limit the thickness, which allows for efficient cooling.

Each jaw may be provided with one or more cooling fluid ducts, e.g. the cooling fluid being a cooling liquid, e.g. water, being passed through the cooling fluid ducts, e.g. using a pump assembly, e.g. a cooling liquid circuit being a closed circuit including a heat exchanger configured to remove heat from the cooling liquid.

In an embodiment, or in combination with cooling by means of cooling liquid, air cooling can be employed for the jaws. Yet, due to the capacity, cooling by means of cooling liquid is preferred. Preferably the cooling liquid is passed in close proximity to the inductor of the jaw, e.g. directly behind the one or more elongated inductor sections. Preferably, no cooling fluid is passed in a region between the inductor and the susceptor as that would unduly increase the distance between them and would impair effectivity of the impulse heating induced by the field. It will be appreciated, that in view of the desired very close proximity of the susceptor element to the front surface of the jaw, there is in practice no space for any cooling duct in said region. So, in practical embodiments, cooling of the jaw is preferably done using a control flow of cooling fluid, e.g. liquid, through one or more ducts that are arranged behind, and preferably in close proximity to, the inductor sections.

In an embodiment, at least one cooling fluid duct extends along the at least one conductor section that extends along the rear side of the susceptor element.

It is preferred for the sealing device to be configured such that cooling of the jaw is active during the entire impulse sealing cycle, so also during the creation of the heat impulse which happens so fast that it is generally not impaired by the cooling. In another configuration the cooling may be interrupted or reduced around the moment of the heat impulse.

The cooling of the jaws may, as preferred, be configured to cause cooling of the heat-sealed region of the pouch walls before the jaws are opened, e.g. the film material and spout being cooled to below 60° C. before opening, e.g. to below 40° C.

The cooling of the jaws may, as preferred, be configured to cause cooling of the heat-sealed edge region before the jaws are opened, e.g. the film material and spout being cooled to below the crystallization temperature of the polymer material involved in the join.

A benefit of the cooling is that, before the release from the jaws, the region of the pouch will acquire a strength and rigidity that is greater than in absence of such cooling. This, for instance, may allow for an increased production speed of the machine wherein higher forces may be exerted on the walls of the pouch, e.g. in view of transport of the pouch or string of interconnected pouches through the machine. Undue stretching of the pouch, e.g. in the area of the spout, is preventable to a large degree by use of the invention disclosed herein.

In an embodiment, the susceptor element is made of metal material, e.g. a metal or a metal alloy, e.g. of a thin metal strip.

For example, the susceptor element is made of, or comprises, aluminium, nickel, silver, stainless steel, and/or nickel-chrome.

In an embodiment, the susceptor element is embodied as a strip having opposed front and rear main faces that define the thickness of the strip between them. In an embodiment, the thickness of the susceptor element strip is constant over the extension of the strip.

In an embodiment, the susceptor element is embodied as a planar strip, most preferably the jaw having a single planar strip susceptor element.

In an embodiment, the susceptor element comprises a paramagnetic material, a diamagnetic material, or a ferromagnetic material. Such magnetic materials may be effected by an electromagnetic field, in order to achieve eddy currents that cause the mentioned rapid heating in the impulse sealing technique.

In an embodiment, the susceptor element is a strip, e.g. of a metal, e.g. of aluminium, wherein the height of the strip is between 3 and 10 millimetres, e.g. between 4 and 8 millimeters. For example, as preferred, the strip has a constant height over its length.

Preferably, the susceptor element strip lacks apertures over its extension.

In an embodiment, the jaw is provided with a single continuous susceptor element embodied as a strip, e.g. of metal.

In an embodiment, the susceptor element, e.g. embodied as a strip, has a thickness of between 0.01 and 5 mm, preferably between 0.05 and 2 mm, more preferably between 0.08 and 0.8 mm, e.g. of between 0.3 and 0.5 mm. In general, it is considered desirable to have a minimum thickness of the susceptor element in view of the desire to rapid cool the jaw, including the inductor and the susceptor, after termination of the heat impulse. A thin design of the susceptor, contributes to this desire. It is noted that, in contrast to the impulse sealing device addressed in the introduction, no electric current from a current source is passed through the susceptor, so the cross-section need not be designed to deal with such a current flow.

In an embodiment, the jaw is provided with a single continuous susceptor element embodied as a strip, e.g. of metal, having a height of the strip between 3 and 10 millimetres, e.g. between 4 and 8 millimeters, and a thickness of between 0.08 and 0.8 mm, e.g. of between 0.3 and 0.5 mm. For example, the strip is made of aluminium material.

In embodiments, the frequency of the alternating electric current supplied to the inductor is between 250 KHz and 750 KHz.

In an embodiment, a jaw is embodied such that the high frequency electromagnetic field generated by the inductor primarily causes the very rapid development of heat within a frontal skin layer of the susceptor element due to the so-called skin effect. The skin effect is the tendency of an alternating electric current to become distributed within a conductor such that the current density is largest near the surface of the conductor and decreases, exponentially, with greater depths of the conductor. At high frequencies the skin depth becomes smaller. This depth may, for example, be 0.15 mm for an aluminium susceptor element if the frequency of the field is 350 KHz. The thickness of the susceptor element is envisaged to be more than this skin depth, yet not too much for the reason addressed herein.

In another embodiment of the impulse heat sealing device, as described in the introduction, impulse heat sealing involves temporarily passing an electric current through a resistor band in each of the jaws of the sealing device so as to generate an impulse of heat that is emitted by the resistor band.

A third aspect of the invention relates to a method of production of a pouch packaging, wherein a spout is heat sealed in a non-bonded region between opposed first and second walls of a pouch, the spout comprising a plastic spout body that has a passage for filling the pouch with a substance and/or for discharging a substance from the pouch, wherein the spout body comprises:
  an attachment portion having a first vertical plane of symmetry, a vertical first sealing wall, and an opposed vertical second sealing wall, and with a transverse wall which is integral with an upper edge of the first sealing wall and with an upper edge of the second sealing wall, wherein the first sealing wall and the second sealing wall each depend from said transverse wall and each have a bottom edge remote from the upper edge,
wherein each sealing wall has an outer sealing surface, wherein the outer sealing surfaces of the sealing walls are to be heat sealed to a respective one of the pouch walls, wherein each sealing wall is, seen in a bottom view of the attachment portion, composed of a first rectilinear portion, a central curved portion, and a second rectilinear portion, wherein the second rectilinear portion of the first sealing wall is integrally connected to the first rectilinear portion of the second sealing wall at a first pointed end of the attachment portion to define an acute angle between them, wherein the second rectilinear portion of the second sealing wall is integrally connected to the first rectilinear portion of the first sealing wall at a second pointed end of the attachment portion to define an acute angle between them, wherein the transverse wall has an opening therein,
   a tubular neck having a bore that adjoins the opening in the transverse wall, which tubular neck is integral with and extends upwards from the transverse wall, which tubular neck together with the opening in the transverse wall forms the passage, wherein the heat sealing of the pouch walls onto the outer sealing surfaces of the sealing walls of the spout is performed with a heat sealing device comprising a first jaw and a second jaw, wherein the heat sealing comprises clamping the first pouch wall with the first jaw of a sealing device onto the outer sealing surface of the first sealing wall, and clamping the second pouch wall with the second jaw onto the outer sealing surface of the second sealing wall, wherein the heat sealing device is operated to provide heat from each of the jaws so as to heat seal the pouch walls onto the outer sealing surfaces of the sealing walls, characterized in that use is made of an induction based impulse heat sealing device, wherein each of the first and second jaws comprises:
   at least one susceptor element comprising electrically conductive material, e.g. one susceptor element dimensioned corresponding to the outer sealing surface of the sealing wall, e.g. as a single elongated metallic strip, which susceptor element extends at least along a recessed face portion, said recessed contact face portion including rectilinear face portions and a central curved face portion of the recess corresponding to the attachment portion, and preferably also along coplanar face portions of the front face of the jaw, and which susceptor element is covered by a heat-resistant covering for contacting the first and second pouch walls in the clamped position of the first and second jaws,
   an inductor which is electrically insulated from the respective susceptor element, wherein, preferably, the inductor comprises an elongated inductor section that extends along a rear side of the respective at least one susceptor element,
and in that the induction based impulse heat sealing device is configured and operated to perform a sealing cycle, wherein—with the first and second jaws in the clamped positions thereof—a high frequency electric current source of the impulse sealing device is operated to temporarily feed a high frequency electric current to the inductor of each jaw, thereby generating a high frequency electromagnetic field with each of the inductors, thereby inducing eddy currents in the respective susceptor element with the high frequency electromagnetic field and generating an impulse of heat that is emitted by the susceptor element, which impulses of heat seal the first and second walls to the outer sealing surfaces of the attachment portion of the spout and, preferably, also to each other on opposite sides of the attachment portion, e.g. in a top seam of a pouch, and wherein, after termination of the high frequency electromagnetic field, a cooling is effected, e.g. by cooling liquid circulating through one or more ducts in the jaws, whilst the jaws remain in the clamped position, and wherein the jaws are brought into said opened position once the cooling is completed.

The third aspect of the invention is based on the insight that the described induction based impulse heat sealing is advantageous for sealing a spout having the so-called diamond shape attachment portion between the pouch walls. In particular, the presence of the rectilinear portions in the sealing walls of the spout, with a complementary shaped recess in the front of the jaws also having rectilinear face portions and a central curved face portion, is advantageous in view of the desired to achieve uniformity of full surface contact between the jaws and the pouch wall, in particular in the area of the susceptor element, and between the pouch wall and the outer sealing surface of the attachment portion of the spout. Preferably, the contoured front faces of the two jaws as well as the outer sealing surfaces of the attachment portion of the spout are smooth. In particular, this approach avoids entrapment of air, even with a low or even minimal clamping force of the jaws, providing the related benefits as discussed herein. The induction based heat impulse sealing allows for optimal uniformity of the heat created in the susceptor element. This is in particular true for a design wherein the inductor extends along the rear of the susceptor element.

It will be appreciated, that in the context of the third aspect of the invention, it is possible, or even preferred, to include one or more of the measures according to the first aspect and/or the second aspect of the invention and/or as otherwise described herein. For example, the heat-sealable film material is preferably of a single polymer.

The third aspect of the invention also relates to an induction based impulse heat sealing device configured to perform the above method.

The invention will be explained below, with reference to embodiments, which are displayed in the appended drawings.

Figures 1, 2A:
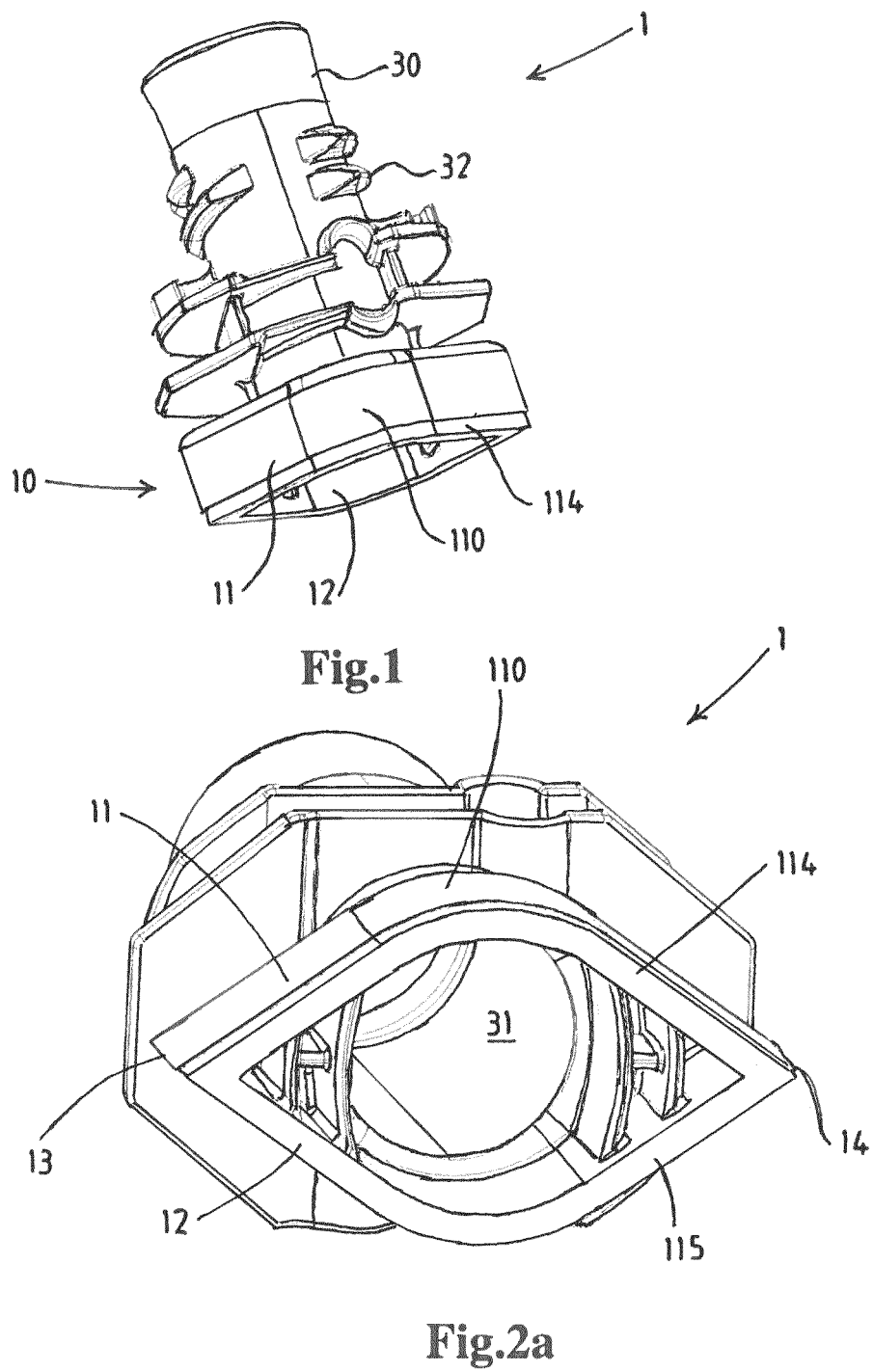
FIG. 1 shows an embodiment of a spout according to the invention.
FIG. 2A shows the spout of FIG. 1 from another angle.
Figure 2B:
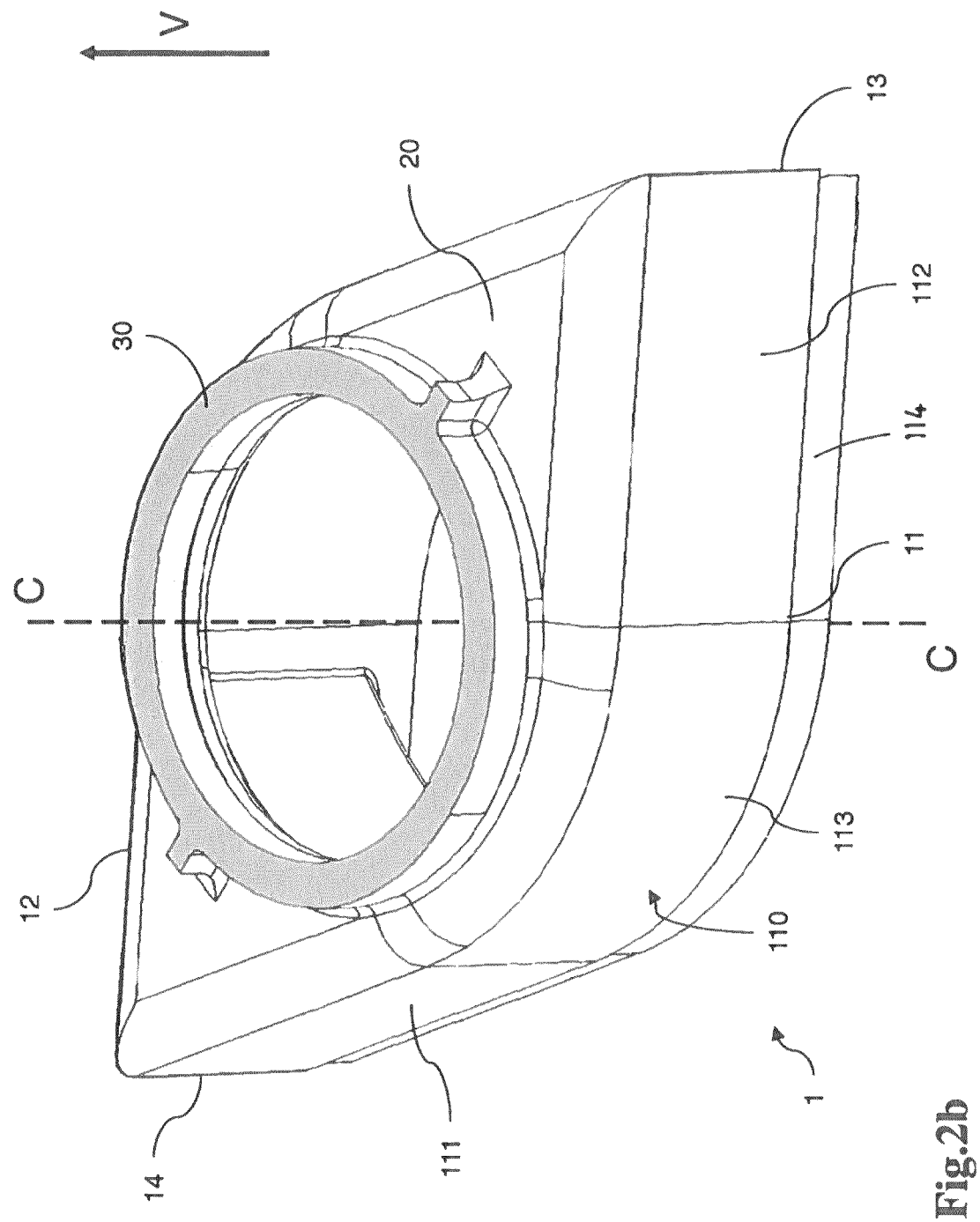
Figure 3:
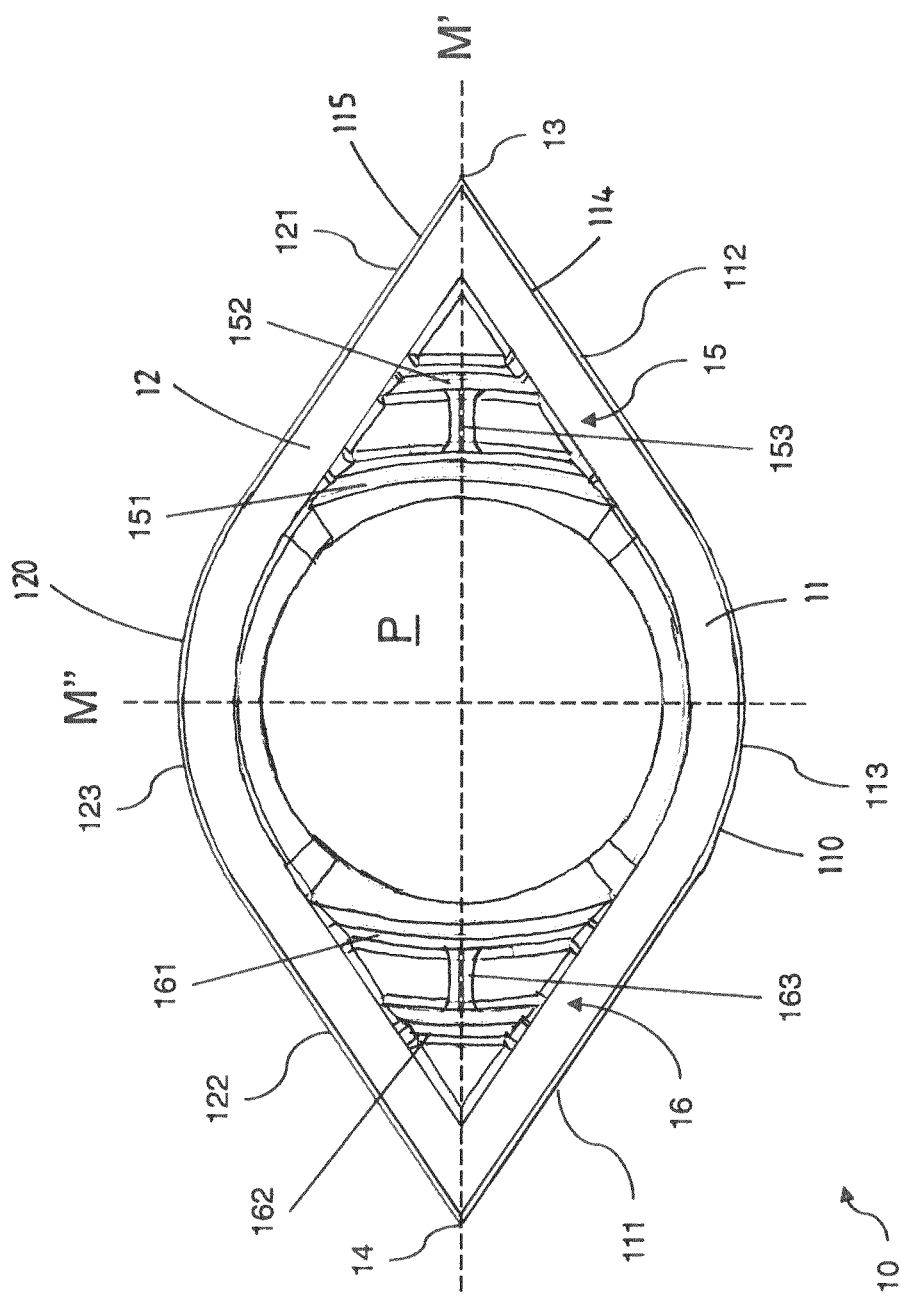
Figure 4A:
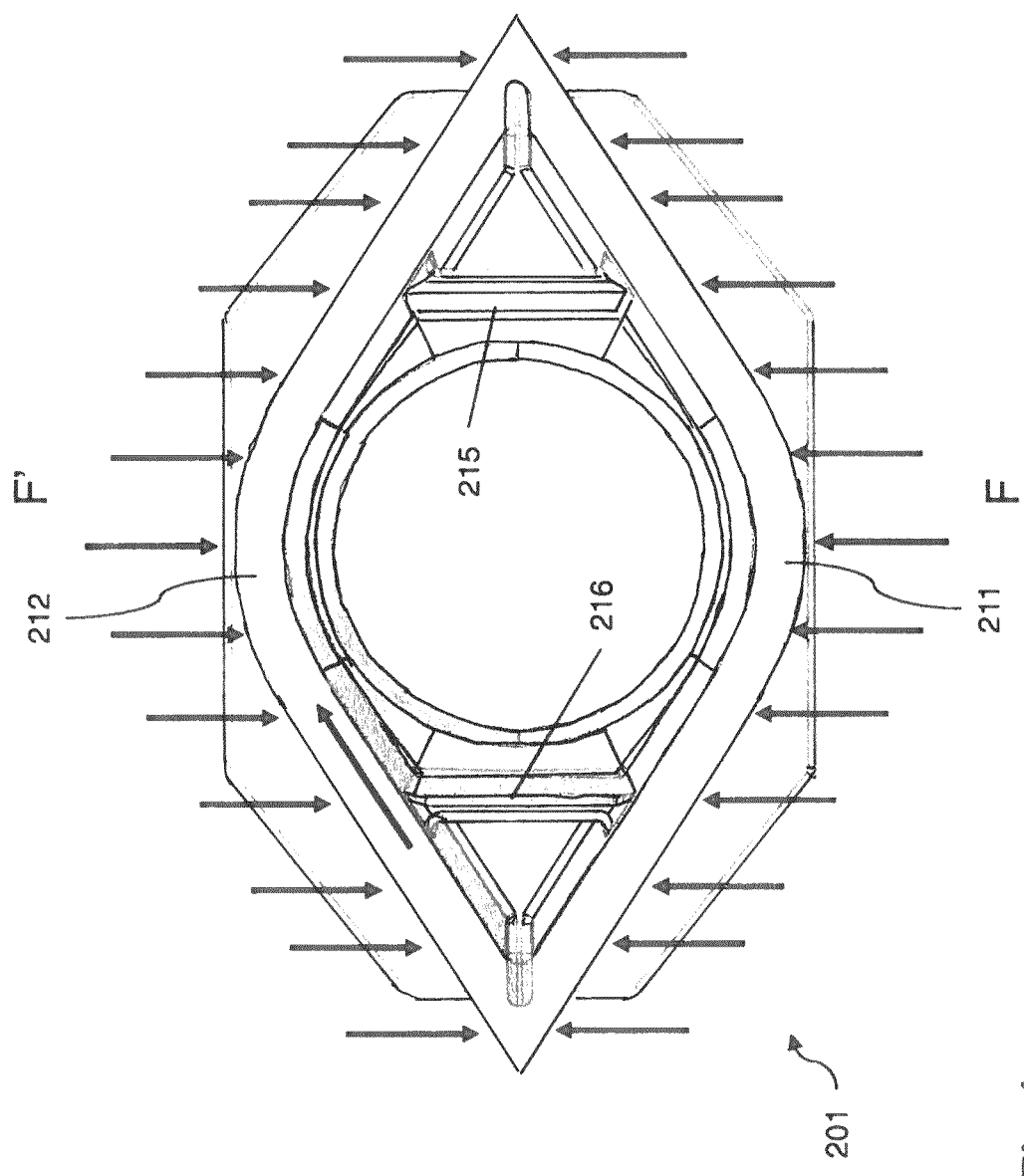
Figure 4B:
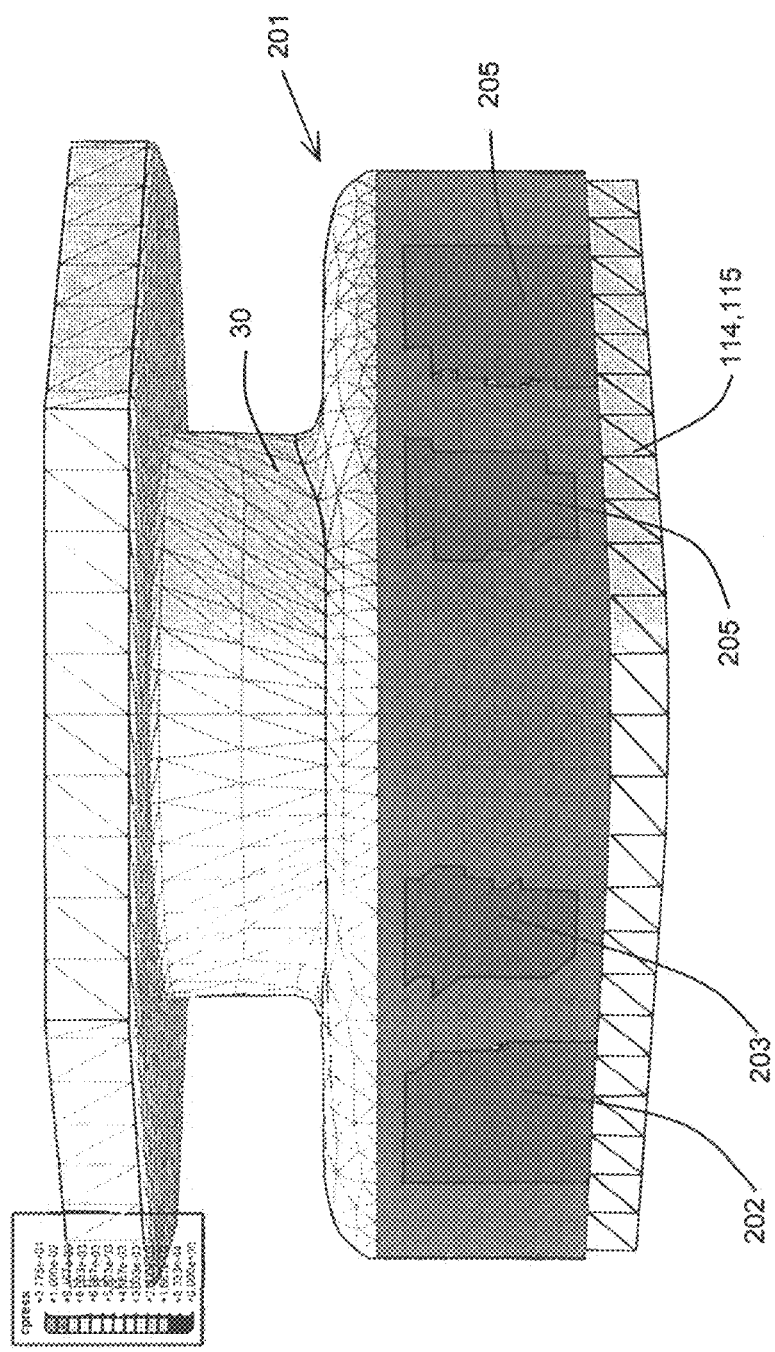
Figure 5A:
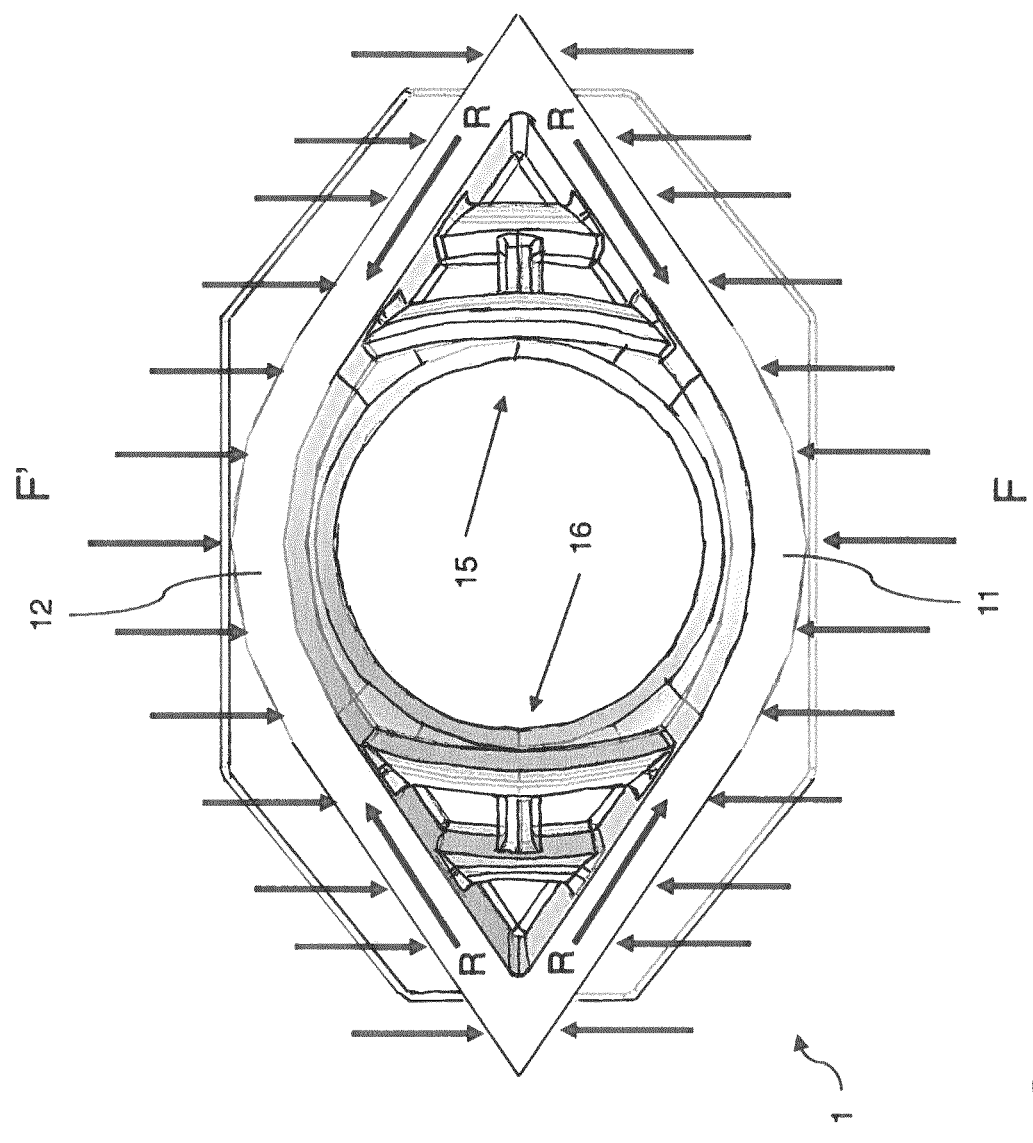
Figure 5B:
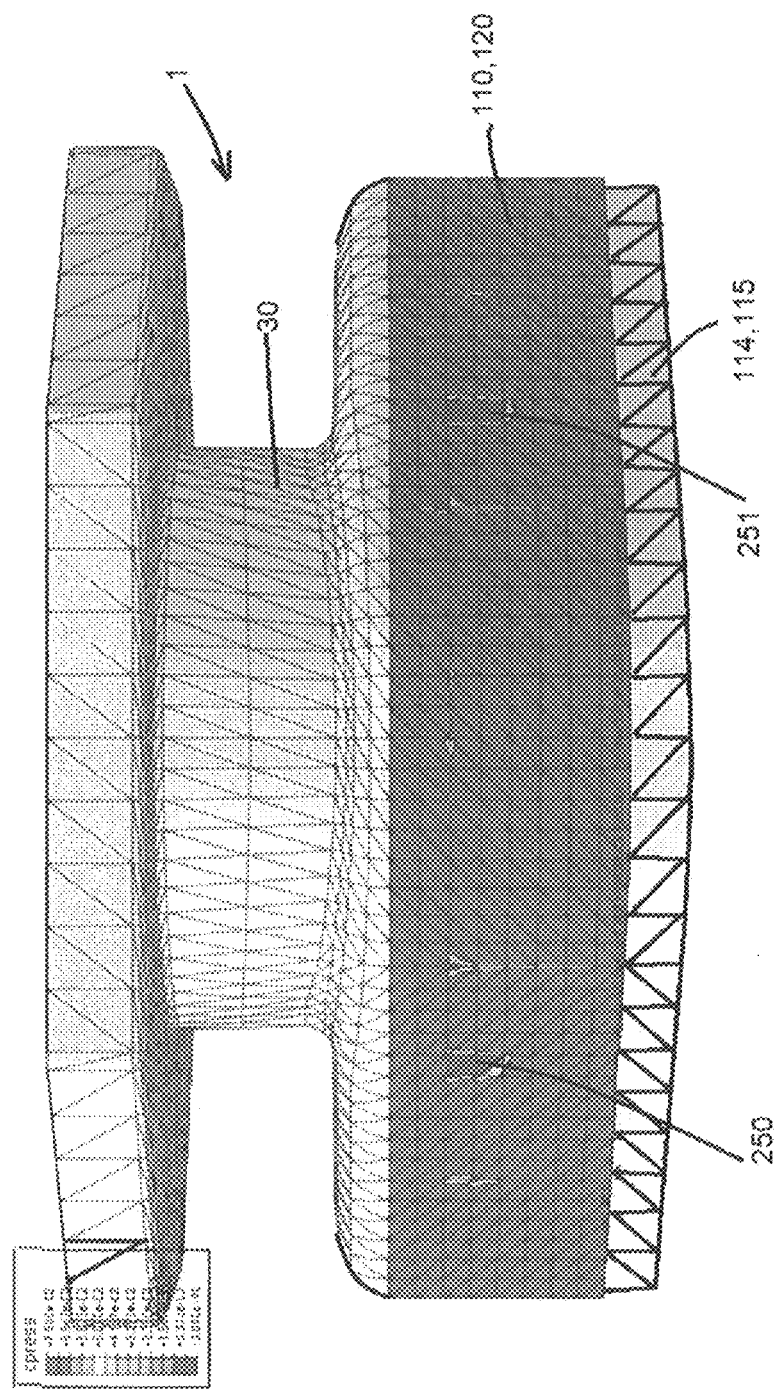
Figure 6A:
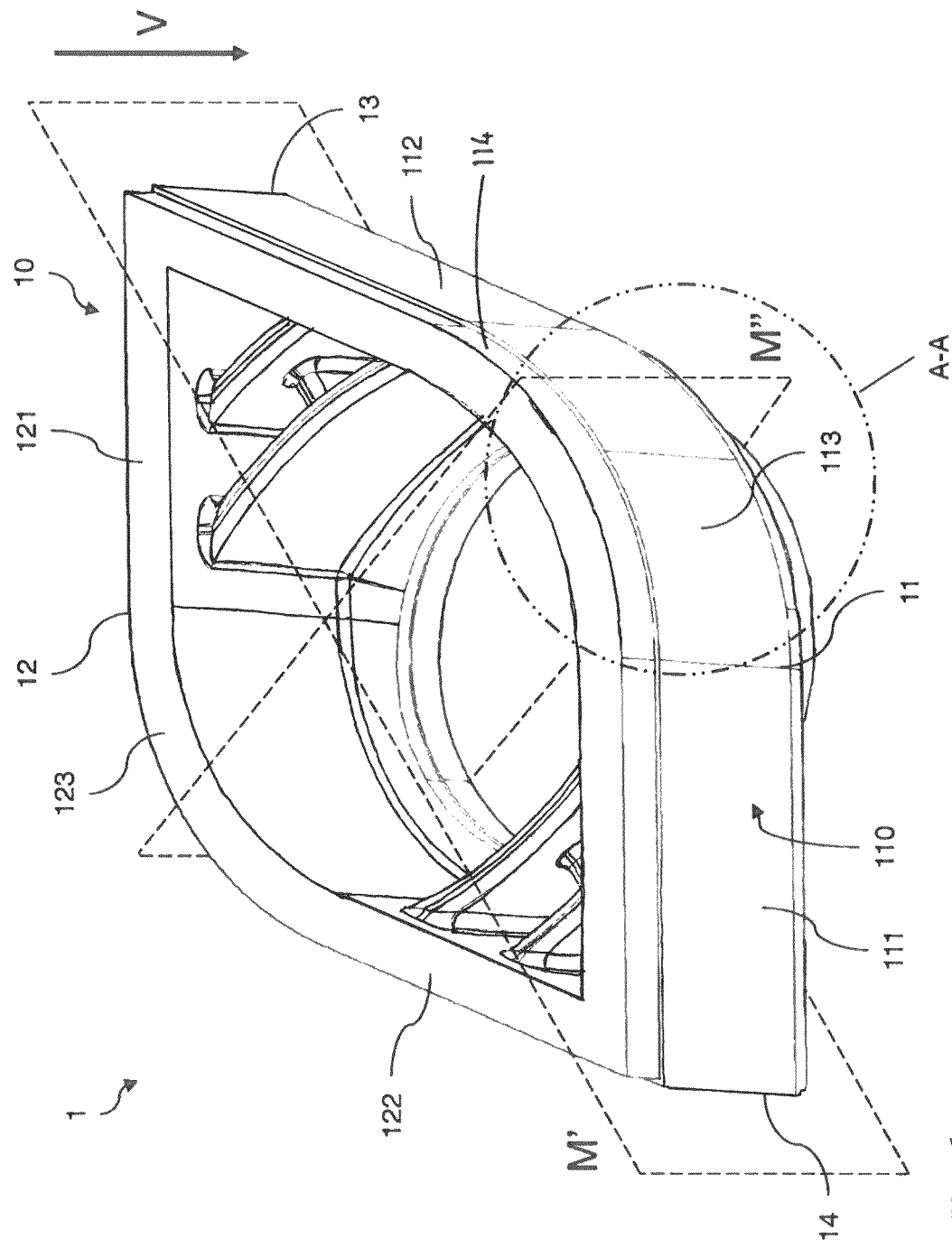
Figure 6B:
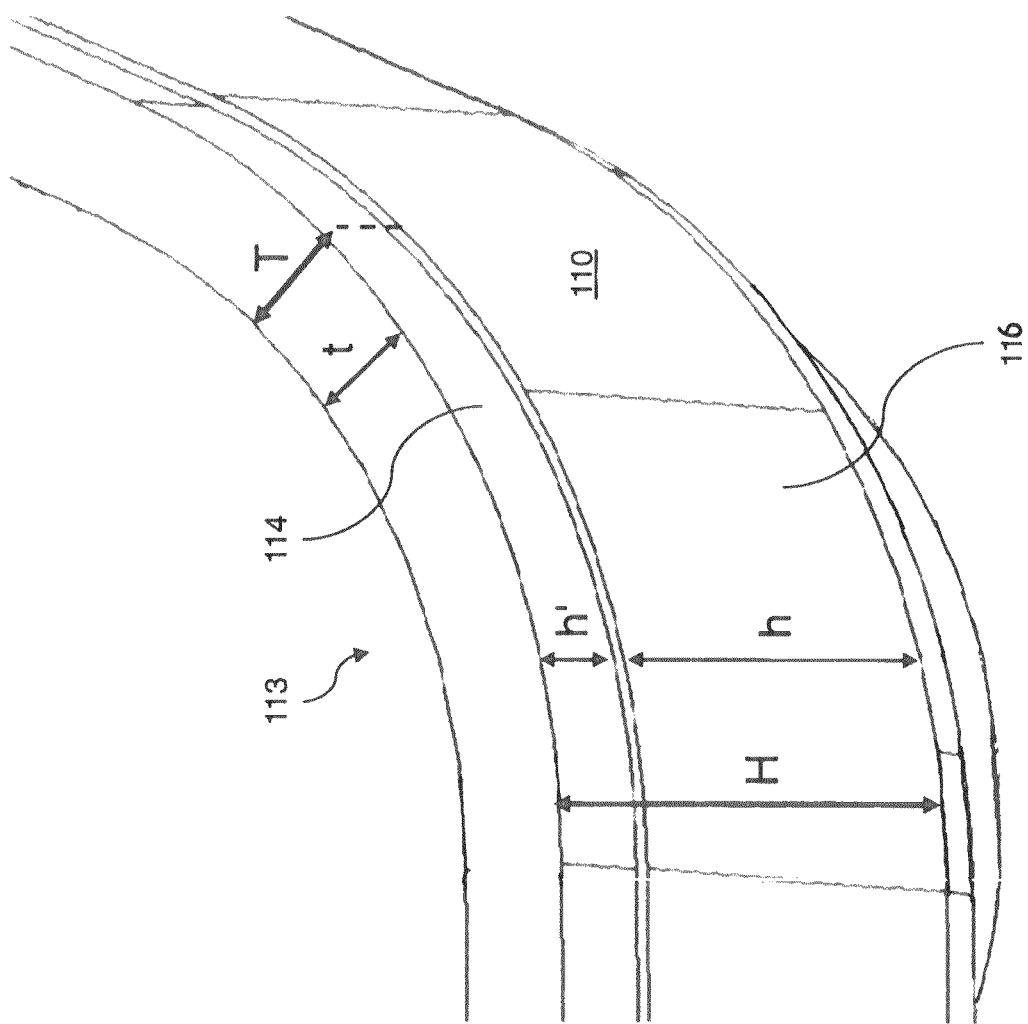
Figure 8:
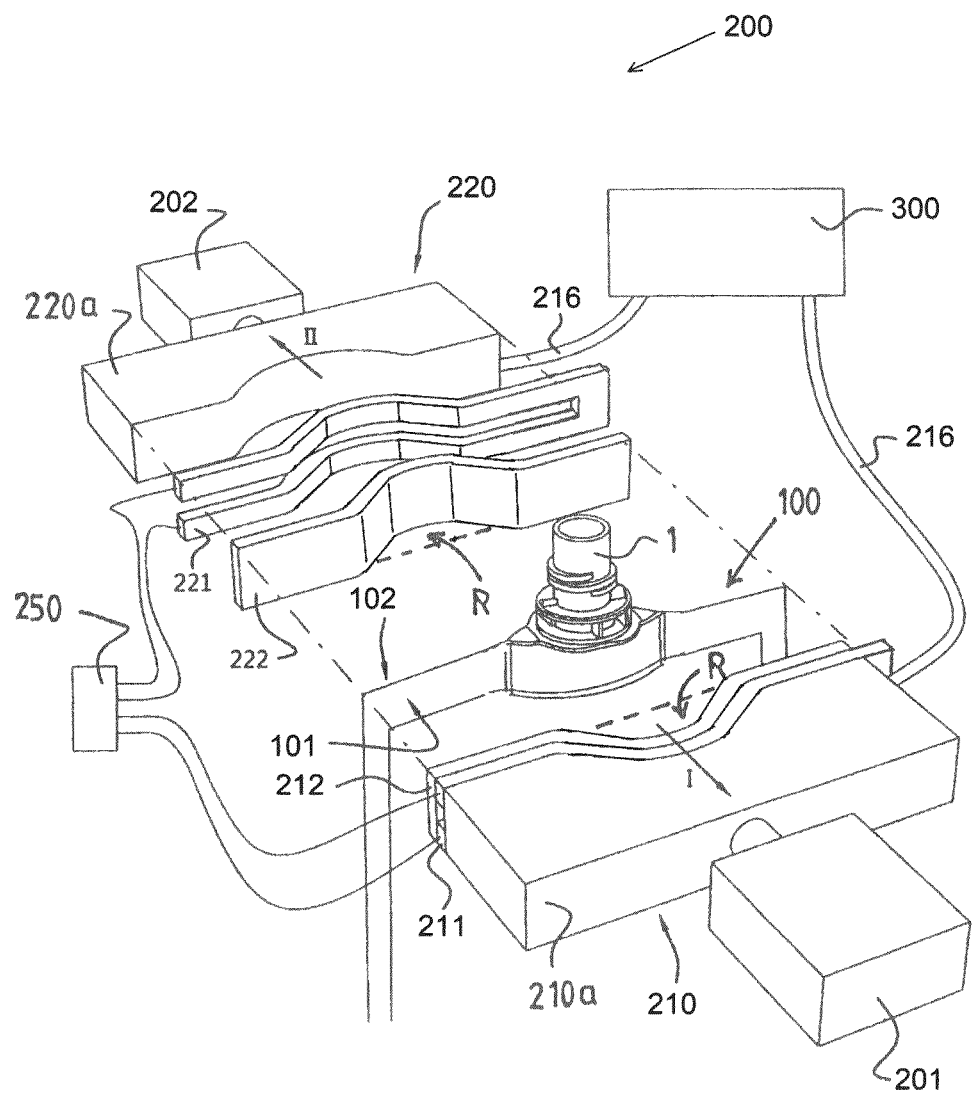
Figure 9:
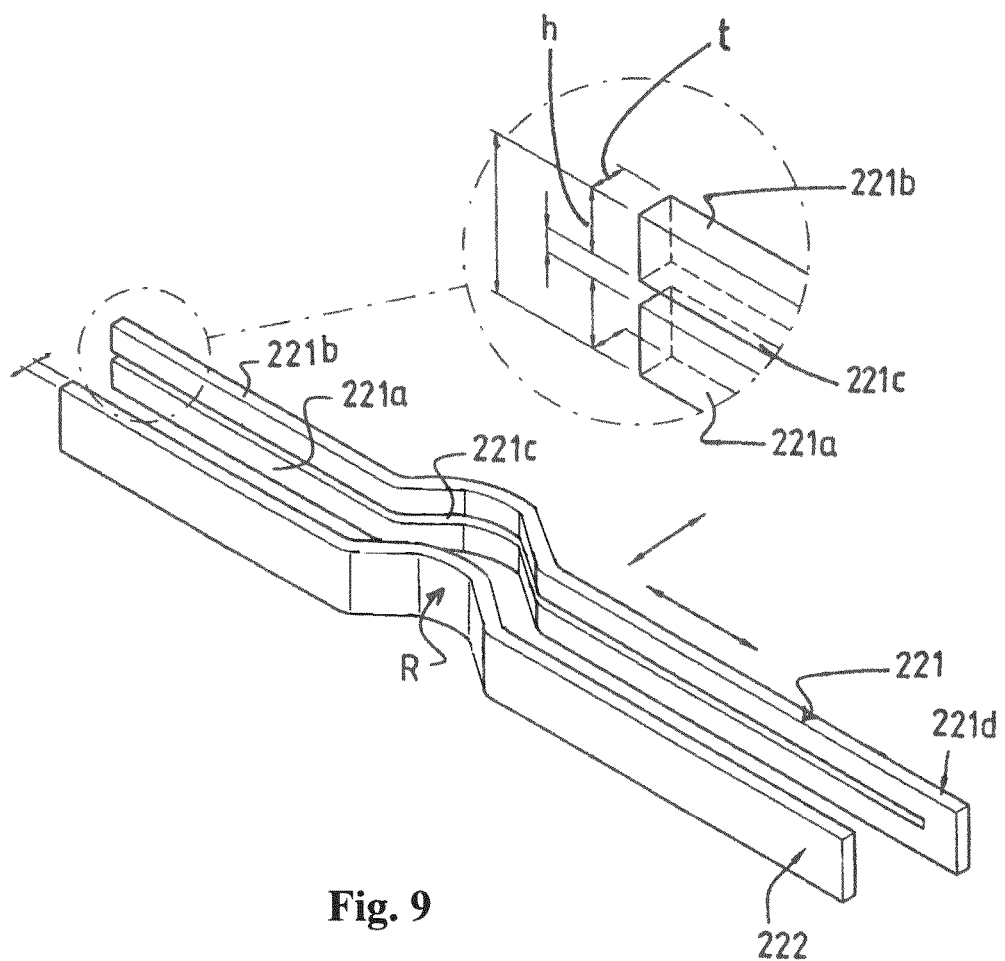
Figure 10:
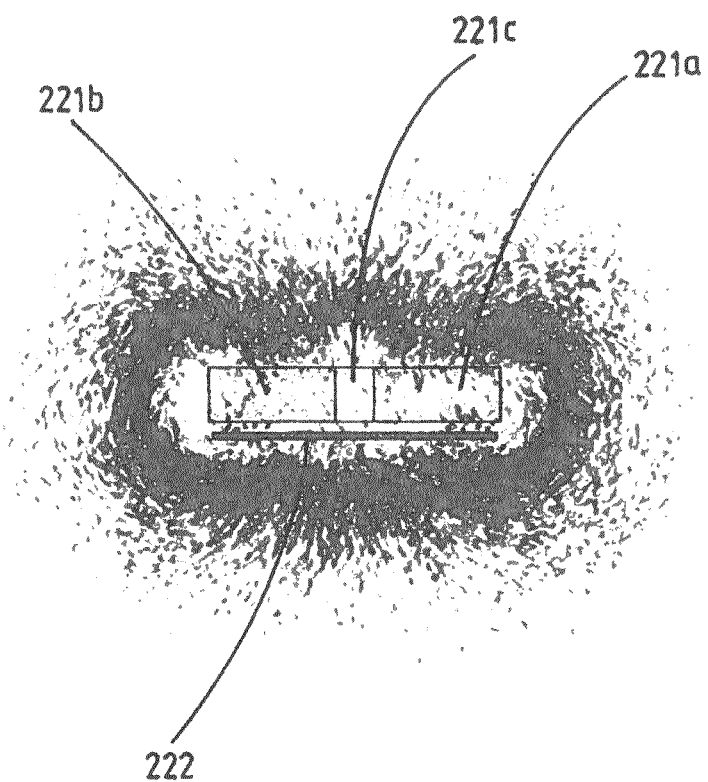
Figure 11:
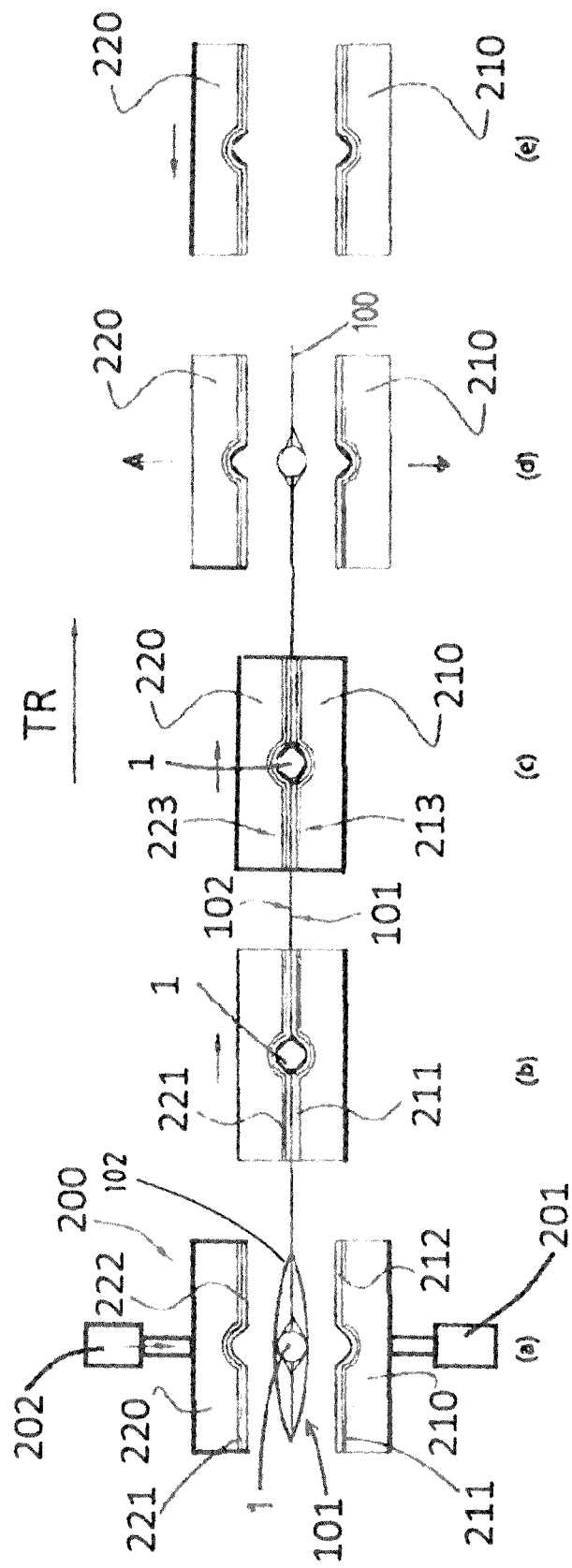
Figure 12A:
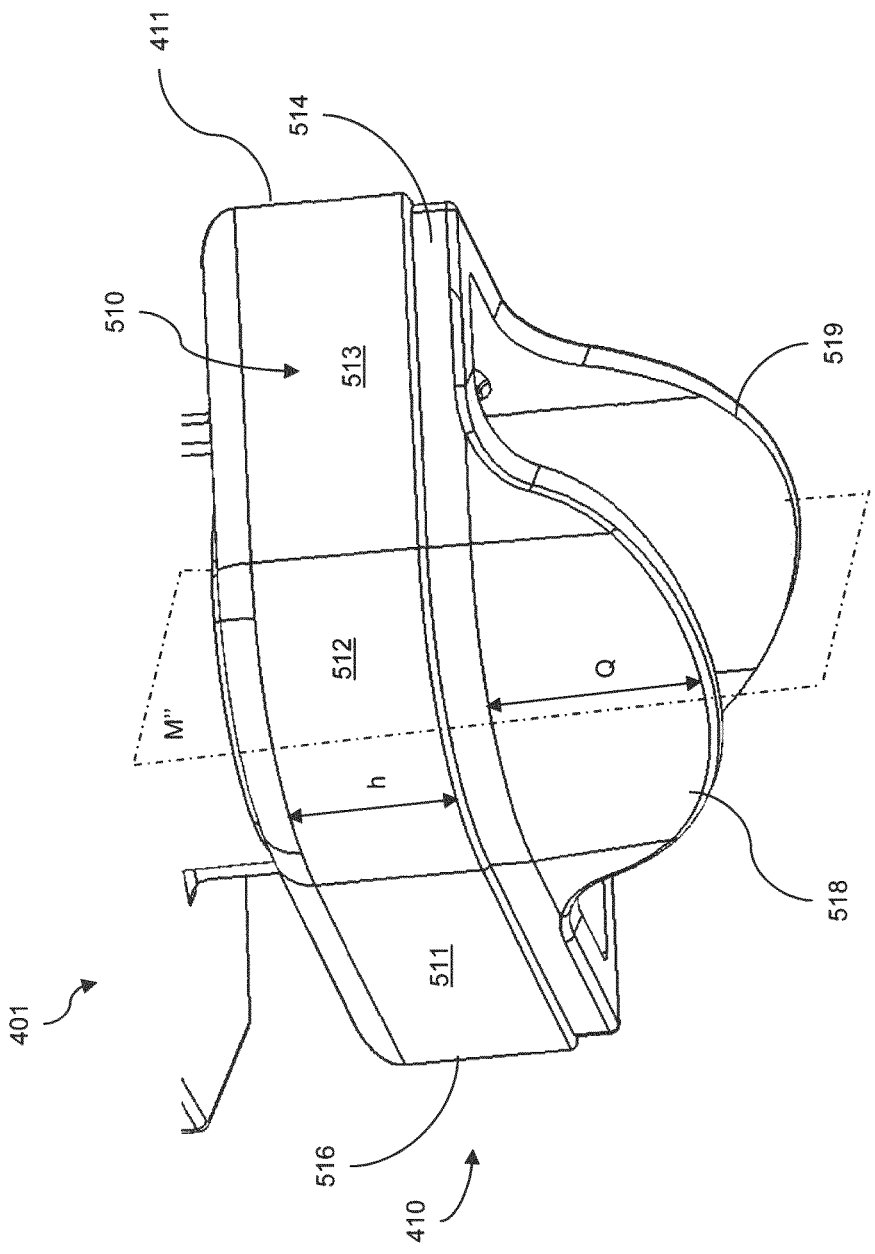
Figure 12B:
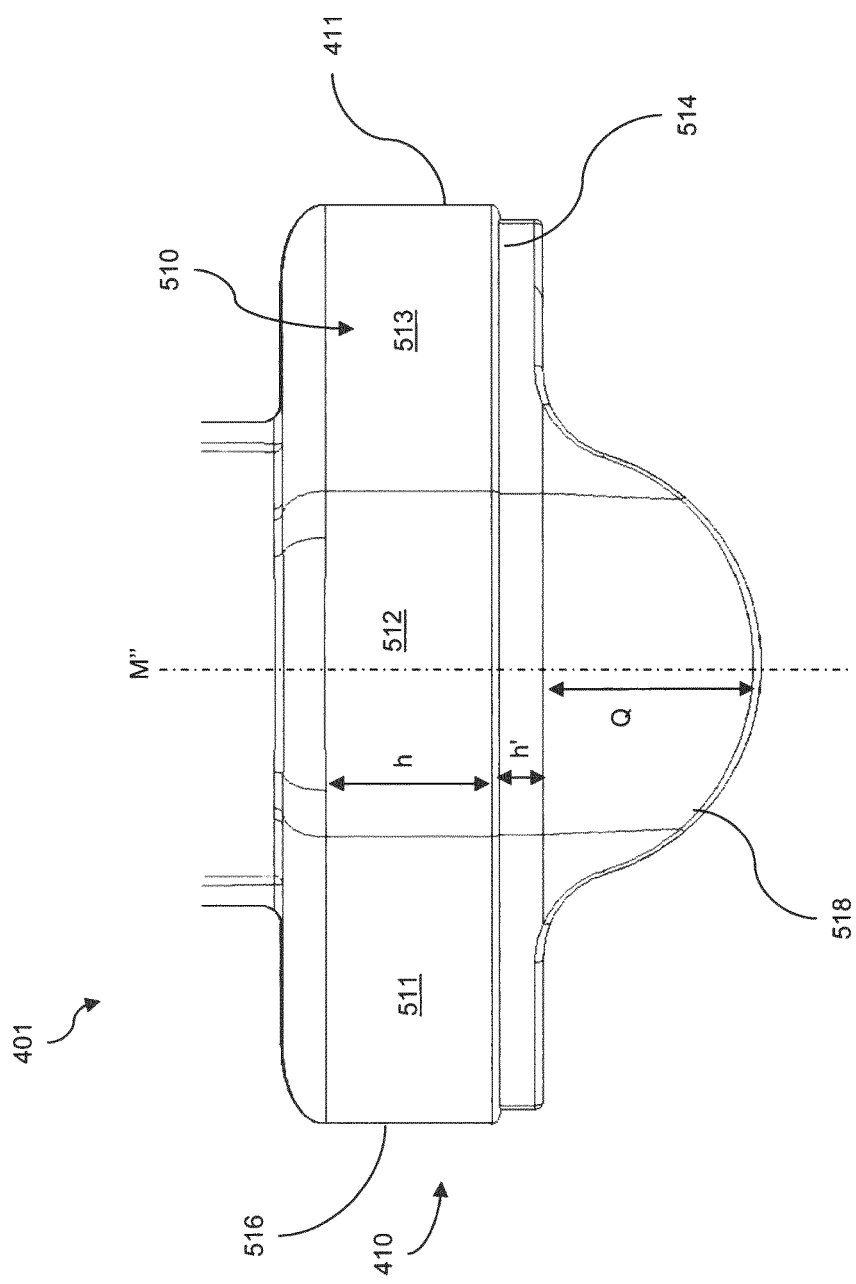
Figure 12C:
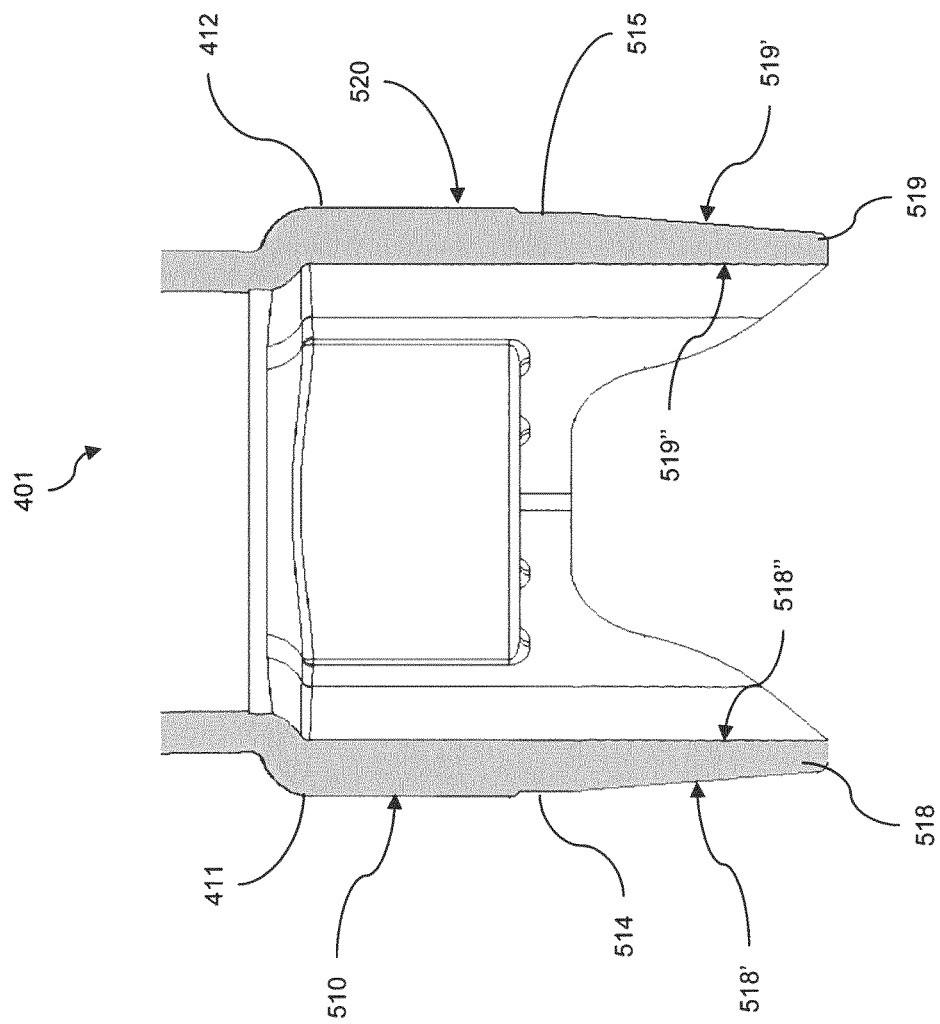
Figure 12D:
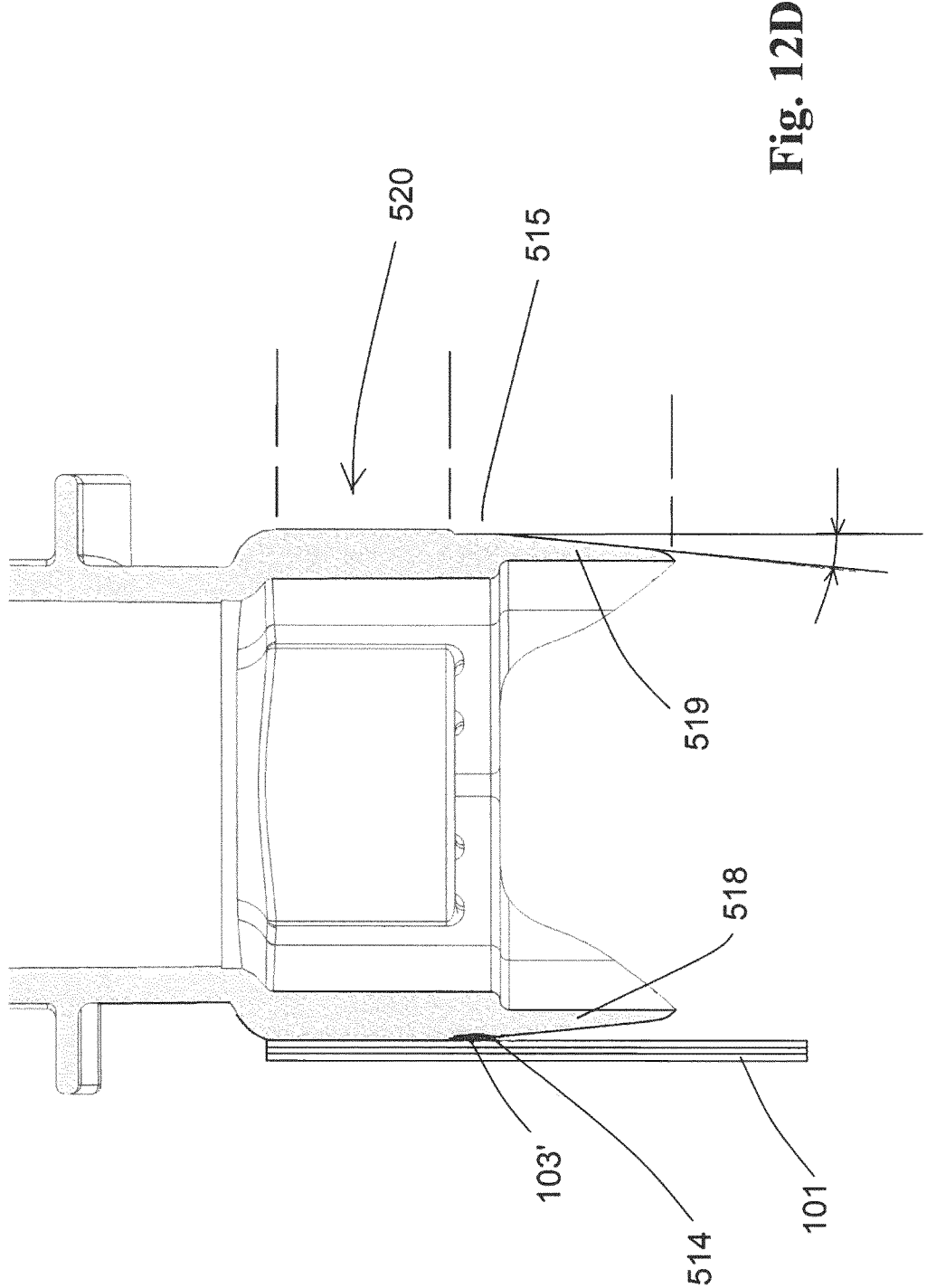
Figure 13A:
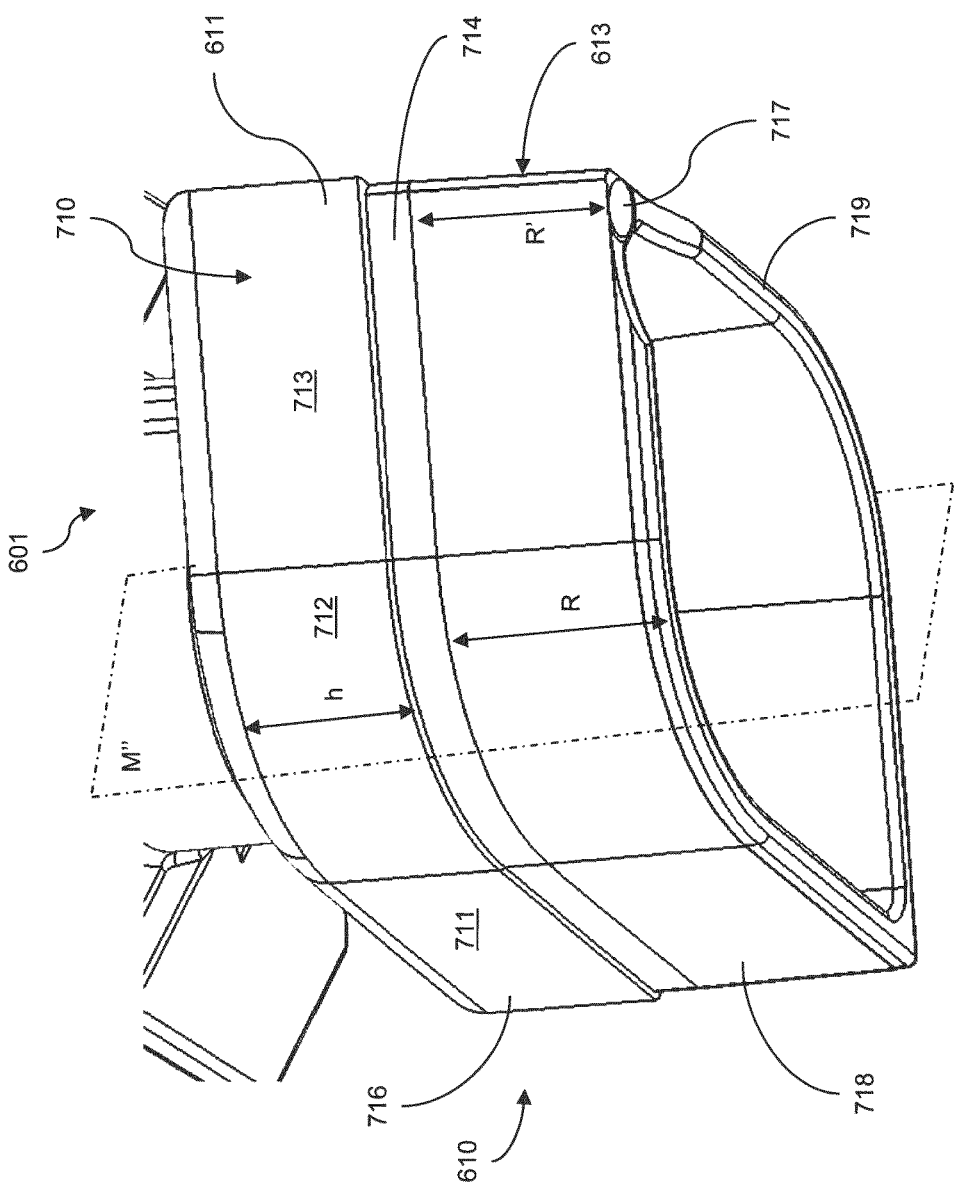
Figure 13B:
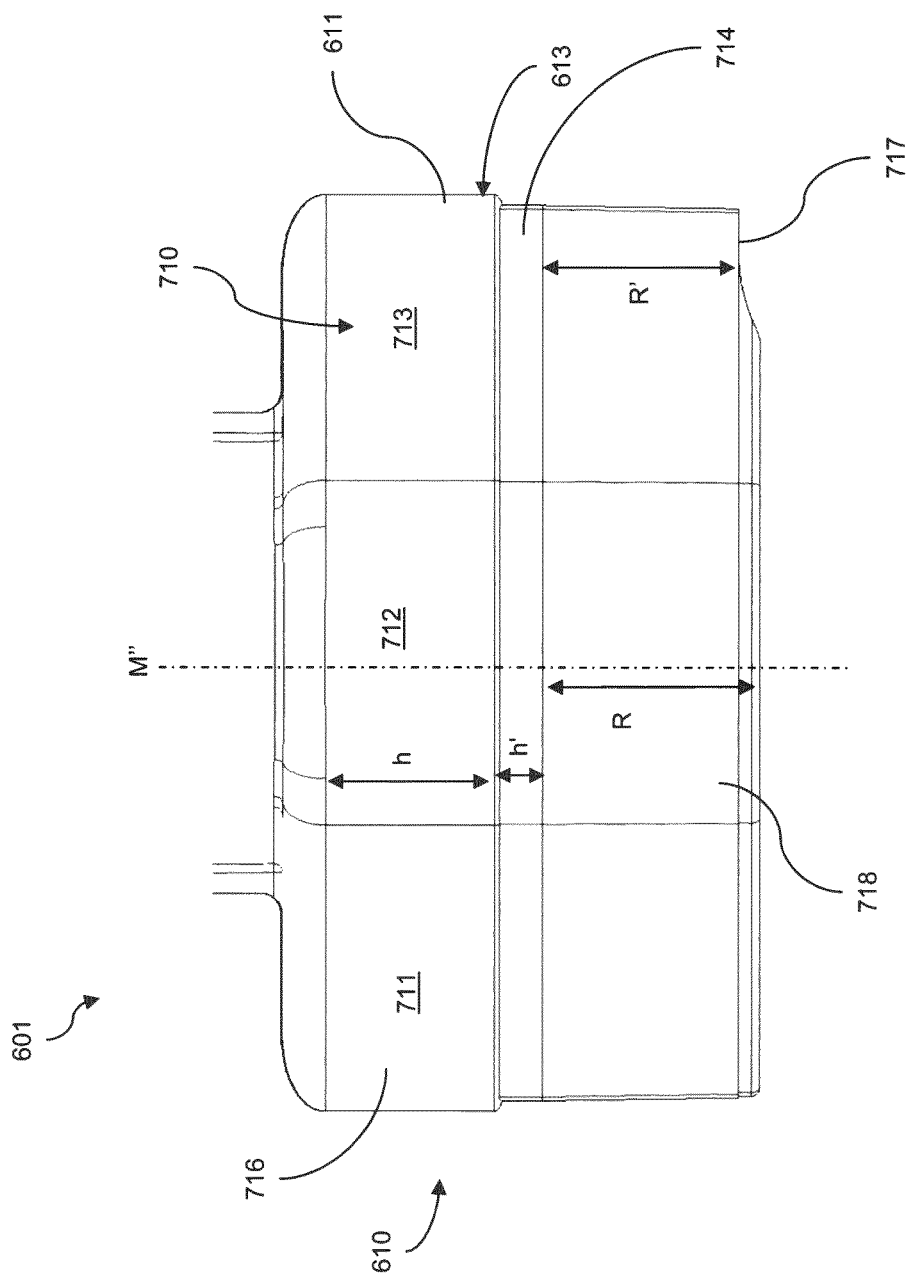
Figure 13C:
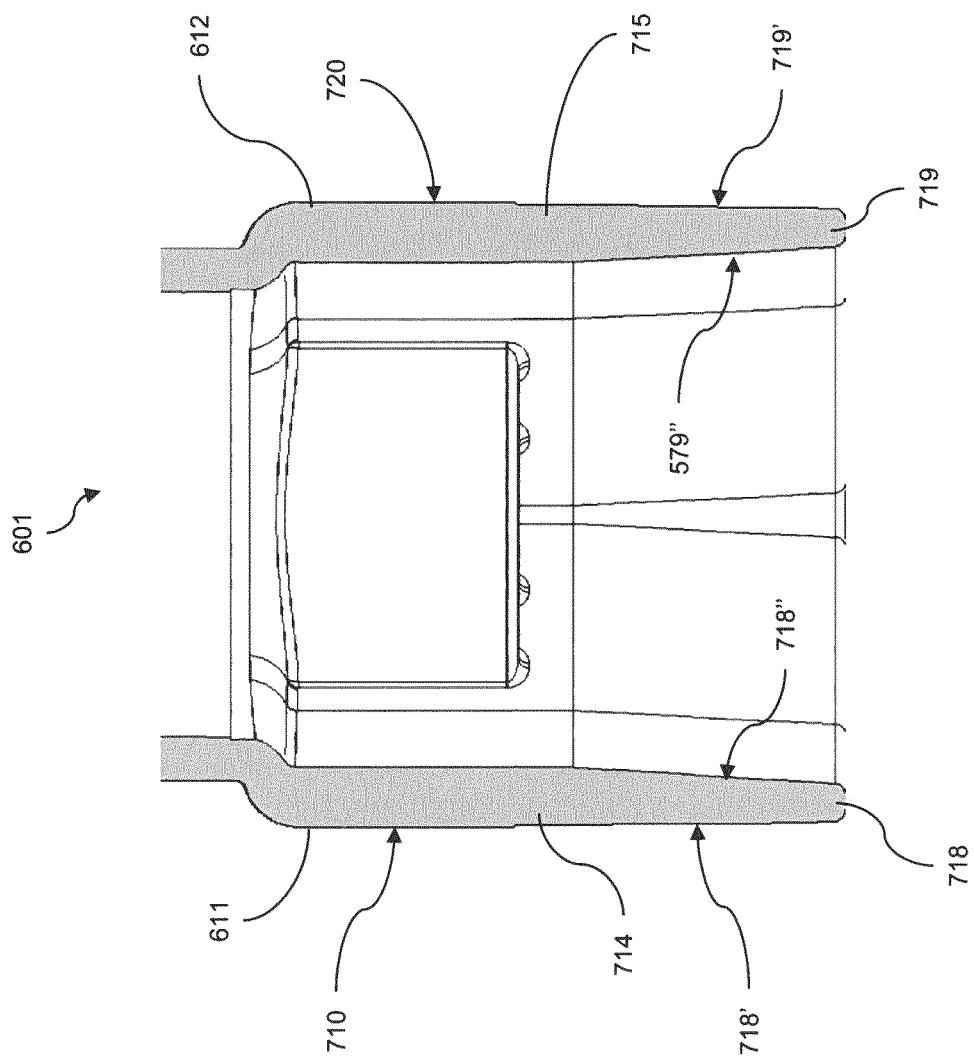
Figure 14A:
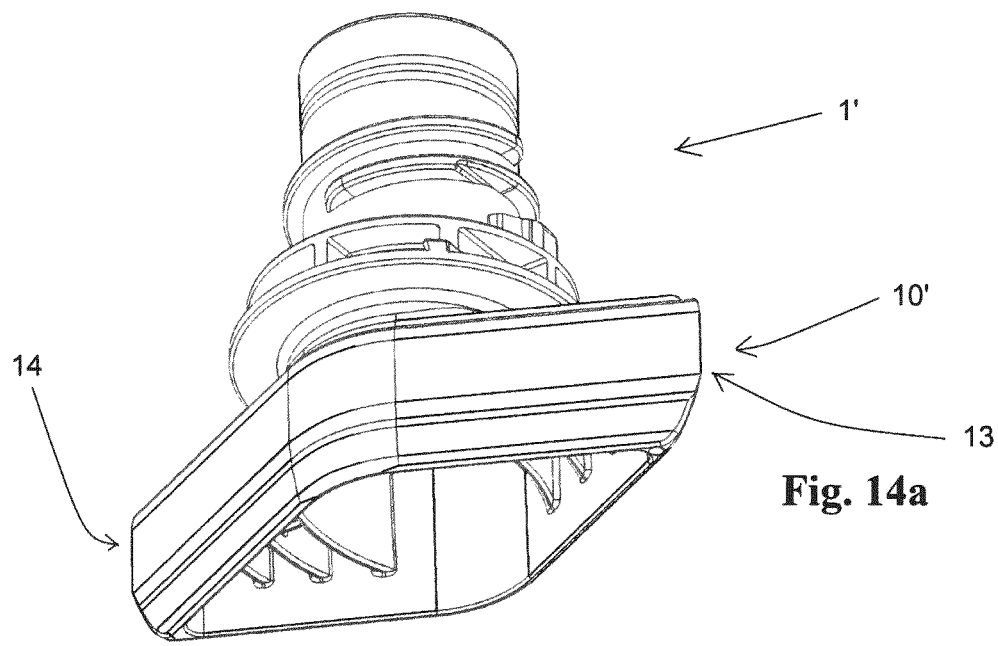
Figure 14B:
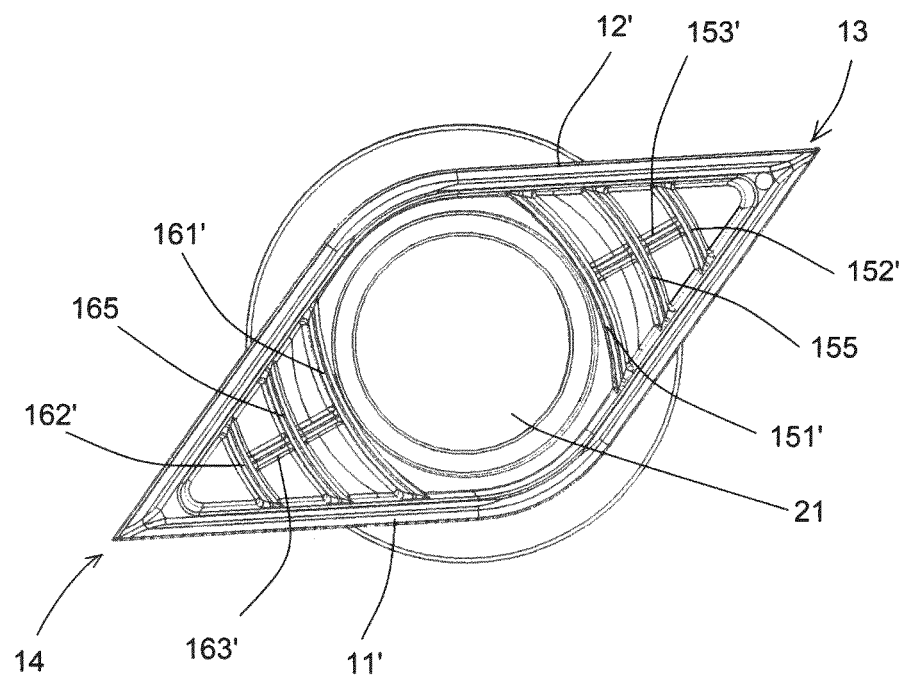
Figure 14C:
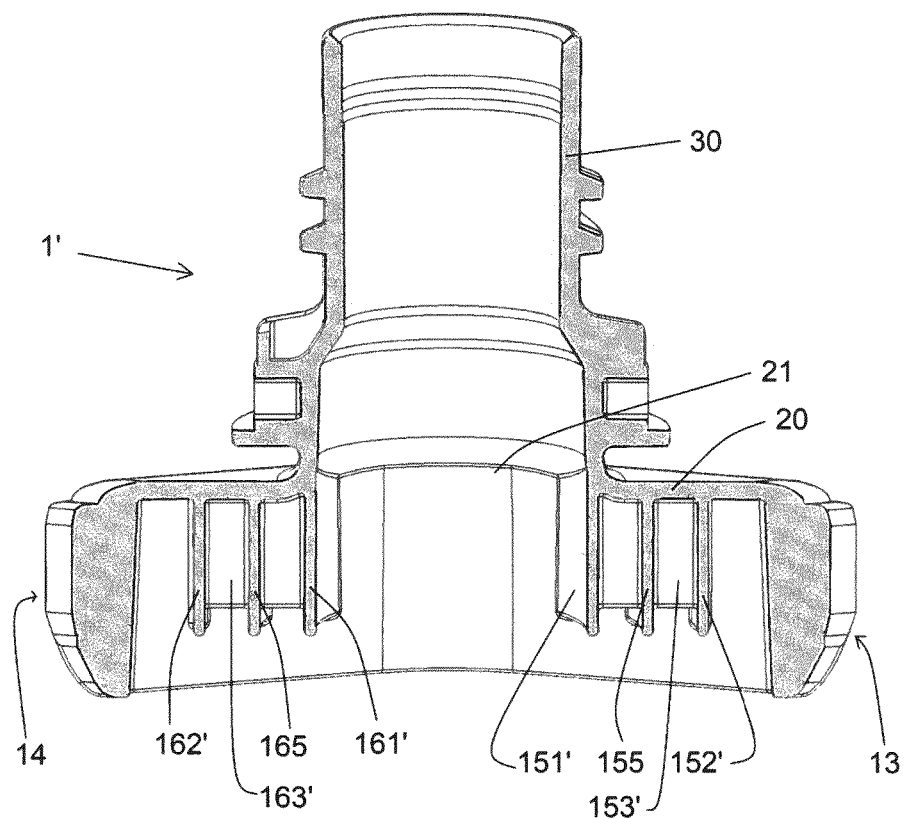
Figure 14D:
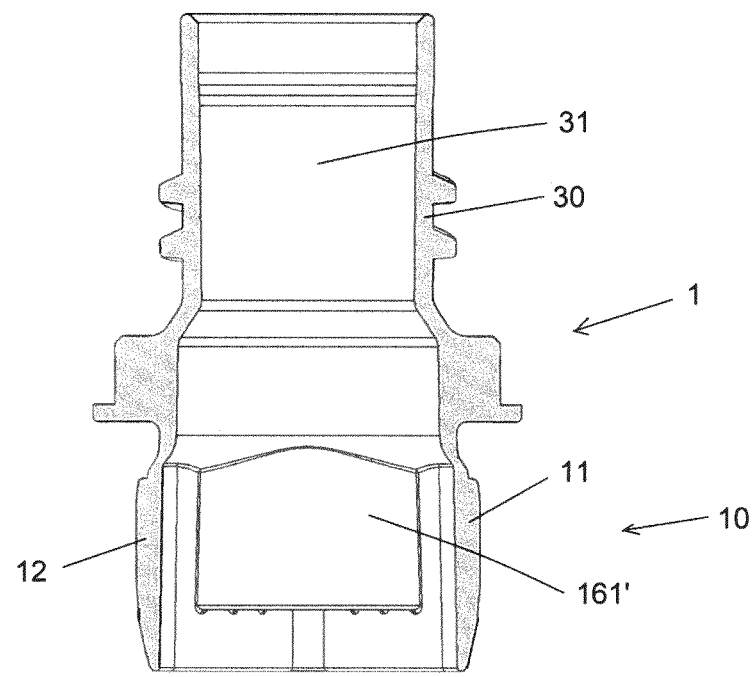

FIG. 2B shows the attachment portion and part of the neck of the spout of FIG. 1, FIG. 3 shows a bottom view of the spout of FIG. 1, FIGS. 4A and 4B respectively illustrate a spout having straight stabilizing ribs and a simulation with clamping forces applied thereon, FIGS. 5A and 5B respectively illustrate the spout of FIG. 1 and a simulation with clamping forces applied thereon, FIG. 6A shows a bottom perspective view on the spout of FIG. 1, FIG. 6B shows a magnification of the encircled area A-A in FIG. 6A, FIG. 7A illustrates in a cross-sectional view the second aspect of the invention, FIG. 7B shows a detail of FIG. 7A on a larger scale, FIG. 7C shows another detail of FIG. 7A on a larger scale, FIG. 8 illustrates the use of an embodiment of an induction based impulse heat sealing device according to the invention, FIG. 9 schematically shows the susceptor element and inductor of FIG. 8, FIG. 10 schematically shows the electromagnetic field generated by the jaw of FIG. 8 and the interaction with the susceptor element, FIG. 11 illustrates schematically the operation of a continuous motion impulse heat sealing device, FIG. 12A shows an alternative embodiment of the spout according to the present invention in isometric view, FIG. 12B shows a front view on the spout of FIG. 12A, FIG. 12C shows a cross-sectional view on the spout of FIG. 12A, FIG. 12D shows an alternative embodiment in a view corresponding to FIG. 12C, FIG. 13A shows a further alternative embodiment of the spout according to the present invention in isometric view, FIG. 13B shows a front view on the spout of FIG. 13A, FIG. 13C shows a cross-sectional view on the spout of FIG. 13A, FIG. 14A shows yet another embodiment of a spout according to the invention, FIG. 14B shows the spout of FIG. 14A from below, FIG. 14C shows the spout of FIG. 14A in a vertical cross-section in a plane offset from the mid-plane of the spout, FIG. 14D shows a transversal and vertical cross-section of the spout of FIG. 14A.

Throughout the figures, the same reference numerals are used to refer to corresponding components or to components that have a corresponding function.

The figures illustrate an embodiment of the spout according to the present invention, indicated with reference numeral 1. The spout 1 is adapted to be heat sealed in a non-bonded region between opposed first and second walls of a collapsible pouch.

The spout 1 has a plastic spout body that is made as a single piece by injection-moulding, for example of polyethylene (PE) material or polypropylene (PP).

The spout body is generally comprised of an attachment portion and a tubular neck.

The attachment portion 10 has an outer contour that is commonly identified as a so-called 'diamond' shape, when seen from below. The structure will be discussed in more detail below.

The attachment portion 10 has a first vertical plane of symmetry M' with a vertical first sealing wall 11 and an opposed vertical second sealing wall 12, and with a transverse wall 20 which is integral with an upper edge of the first sealing wall 11 and with an upper edge of the second sealing wall 12. The first sealing wall and the second sealing wall each depend from the transverse wall 20 and each have a bottom edge 114 remote from the upper edge.

Each sealing wall 11, 12 has one outer sealing surface 110, 120. These outer sealing surfaces 110, 120 of the sealing walls are to be heat sealed to a respective one of the pouch walls.

In practical embodiments, as illustrated, each outer sealing surface 110, 120 forms one continuous elongated area with, preferably parallel, upper and lower borders extending from one pointed end 13 to the other pointed end 14 of the attachment portion 10.

Each sealing wall 11, 12 is, seen in a bottom view of the attachment portion 10, composed of a first rectilinear portion, a central curved portion, and a second rectilinear portion. In more detail, the first sealing wall 11 is composed of a first rectilinear portion 111, a central curved portion 113, and a second rectilinear portion 112, which are integrally interconnected end to end. Similarly, the second sealing wall 12 is composed of a first rectilinear portion 121, a central curved portion 123, and a second rectilinear portion 123, which are integrally interconnected end to end as well.

The second rectilinear portion 112 of the first sealing wall 11 is integrally connected to the first rectilinear portion 121 of the second sealing wall 12 at a first pointed end 13 of the attachment portion 10 to define an acute angle between them.

The second rectilinear portion 122 of the second sealing wall 12 is integrally connected to the first rectilinear portion 111 of the first sealing wall 11 at a second pointed end 14 of the attachment portion 10 to define an acute angle between them.

The transverse wall 20 extends generally horizontally, so generally perpendicular to the walls 11, 12. The transverse wall 20 has a diamond shape that corresponds to the shape of the sealing walls 11, 12.

The transverse wall 20 has an opening 21 therein, that is located in the center between the opposed curved portions of the sealing walls. In practical embodiments, as here, the opening 21 is circular.

In practical embodiments, as shown here, the attachment portion 10 has a second vertical plane of symmetry M" that is perpendicular to the first plane of symmetry M'. As shown here, preferably, the second plane M" extends through the center of the opening 21.

The relative size of the curved portions 113, 123 may be varied, e.g. smaller so that the rectilinear portions of the sealing walls become relatively longer.

The spout body further has a tubular neck 30 having a bore 31 therein. The bore 31 in the neck 30 adjoins the opening 21 in the transverse wall 20. The tubular neck 30 is integral with and extends upwards from the transverse wall 20. The bore 31 of the neck together with the opening 21 in the transverse wall forms a passage P for filling the pouch with a substance and/or for discharging a substance from the pouch.

A central vertical axis C-C of the tubular neck 30 is arranged here on the intersection line between the first plane of symmetry M' and the second plane of symmetry M".

The tubular neck 30 only extends away from the transverse wall 20 in the upward direction V and does not extend in between the first sealing wall 11 and the second sealing wall 12, that is beneath the transverse wall 20.

It is illustrated here that the neck 30 is provided with a thread 32 to accommodate a screw cap thereon, e.g. as shown in WO2018194454. Other designs of closure assemblies include the inventive spout are also envisaged, e.g. snap caps, quarter turn caps, e.g. as in WO2018034562, or more complex embodiments, e.g. as disclosed in WO2017053228, WO2017135824.

As illustrated the attachment portion 10 further comprises:

at least one first stabilizing rib 15, here ribs 151, 152, extending between associated connection points to the second rectilinear portion 112 of the first sealing wall 11 and to the first rectilinear portion 121 of the second sealing wall 12, and at least one second stabilizing rib 16, here ribs 161, 162, between associated connection points to the first rectilinear portion 111 of the first sealing wall 11 and to the second rectilinear portion 122 of the second sealing wall 12.

As illustrated, seen in a bottom view of the attachment portion as in FIG. 3, the at least one first stabilizing rib 15 is, between the associated connection points, curved toward the first pointed end 13, and the at least one second stabilizing rib 16 is, between the associated connection points, curved toward the second pointed end 14.

The at least one first stabilizing rib 15 here consists of an inner first stabilizing rib 151, disposed adjacent to the opening 21, and an outer first stabilizing rib 152, disposed closer to the first pointed end 13.

The at least one second stabilizing rib 16 here consists of an inner second stabilizing rib 161, disposed adjacent to the opening 21, and an outer second stabilizing rib 162, disposed closer to the second pointed end 14.

As discussed the number of curved stabilizing ribs can be different, e.g. just one curved stabilizing rib between opposed rectilinear portions of the sealing walls or with three or four such ribs instead of the depicted two ribs.

It is illustrated that the curved stabilizing ribs 15, 151, 152, 16, 161, 162 form the sole stabilizers between the opposed sealing walls 11, 12.

The inner stabilizing ribs 151, 161 have a continuous curvature over the length thereof, curved towards the first pointed end 13 and second pointed end 14, respectively. This means that the central portion of the inner stabilizing ribs 151, 161 does not lie on a straight line between its respective connection points to the first sealing wall 11 and to second sealing wall 12. Also the outer stabilizing ribs 152, 162 are curved towards the respective pointed end 13, 14.

The stabilizing ribs are integral at their upper end to the transverse wall 20.

As shown, in practical embodiments, the curved stabilizing ribs have a greater height than their thickness.

It is illustrated, as is optional, that the radius of curvature of the outer stabilizing ribs 152, 162 is larger than the radius of curvature of the inner stabilizing ribs 151, 162. This difference in curvature between the ribs of each set of stabilizing ribs, may be provided in order to achieve that the outer stabilizing rib is relatively stiff under clamping load of the sealing jaws compared to the inner stabilizing rib.

It is illustrated, as is practically preferred, that the radius of curvature of all of the stabilizing ribs is larger than the radius of the circular opening 21 in the transverse wall 20, e.g. at least in the non-deformed state of the spout 1, when no clamping force is applied thereon.

The attachment portion 10 of the spout 1 further comprises a first connecting rib 153, which extends between the inner first stabilizing rib 151 and the outer first stabilizing rib 152. In particular, the first connecting rib 153 is connected to a central portion of the inner first stabilizing rib 151 and a central portion of the outer first stabilizing rib 152. Similarly, the attachment portion 10 comprises a second connecting rib 163, which is connected to a central portion of the inner second stabilizing rib 161 and a central portion of the outer second stabilizing rib 162. Both connecting ribs 153, 163 are located in the first plane of symmetry M', so on a straight line between the first pointed end 13 and the second pointed end 14.

As illustrated, in practical embodiments, the connecting ribs 153, 163 have their upper end integral with the transverse wall.

As illustrated, in practical embodiments, the connecting ribs 153, 163 have a lower height than the stabilizing ribs.

It is noted that, in an embodiment with just one first curved stabilizing rib and just one second curved stabilizing rib, e.g. the inner stabilizing ribs, a connecting rib could be present that connects to the central portion of the curved rib and to the transverse wall so as to provide additional support in the center of the curved rib.

With reference to the FIGS. 4A-5B, the working principle of the curved stabilizing ribs according to the first aspect of the invention is discussed.

FIG. 4A shows the attachment portion and part of the neck of a spout 201 that is presented here to illustrate an embodiment wherein the stabilizing ribs are straight, similar to the mentioned prior art design. The attachment portion of the spout is of the so-called diamond shape and has two sealing walls 211, 212. The spout 201 further comprises straight stabilizing ribs 215, 216 between opposed rectilinear portions of the sealing walls 211, 212.

The spout 201 has been modelled by means of a finite element analysis (FEA). The FIG. 4A indicates clamping forces F, F' that would be exerted by jaws of a heat sealing device, and which are modelled to act on both sealing walls of the spout 201.

In FIG. 4B, the resulting deformation of sealing wall of the spout 201 is illustrated. It is visible that within each rectilinear portion of the sealing walls significant differences in the degree of deformation occur. The reference numerals 202, 203, 204, 205 denote zones where hardly any deformation under a clamping load, that is a relatively light clamping load as preferred, occurs, with the remainder of the sealing wall denoted by 206 showing a fair degree of deformation. These significant local variations in deformation of the sealing walls due to clamping are undesired, since they give rise to uneven sealing between the sealing walls of the spout and the pouch walls. Furthermore, the variations in deformation may result in localized stress concentrations that could cause failure of the spout.

In FIG. 5A, the attachment portion and part of the neck of the spout 1 of FIG. 1 has been modelled, onto which the same clamping forces F, F' have been modelled. It is shown in FIG. 5B that the corresponding deformation of the sealing walls nearly uniform over the entire outer sealing surface, including over the rectilinear portions thereof. Only very minor zones 250, 251 show no deformation. The majority of the outer surface of the sealing walls of the spout according to the first aspect of present invention is thus evenly deformed, as indicated in red.

As explained herein, the effect shown in FIG. 5B is the result of resilient bending of the curved stabilizing ribs under the influence of the clamping force. As a result of this bending, the connection points of these ribs are subjected to a resulting force in the plane of the sealing walls and in a direction away from the respective pointed end. In FIG. 5A, these resulting forces R are displayed. These resulting forces R effect tensile stresses in the sealing walls and provide the result that the rectilinear portions become elongated and straightened.

As shown the outer sealing surfaces of the first sealing wall 11 and of the second sealing wall 12 are each embodied as a smooth outer sealing surface, so lacking any relief that would lead to entrapment of air, e.g. lacking weld lines, etc.

These smooth outer sealing surfaces 110, 120 are each bordered along their lower perimeter by an inwardly-recessed bottom edge 114, 115 of the sealing wall 11, 12. A vertical face of the edge 114, 115 is stepped inward of the vertical outer sealing surface 110, 120.

It is shown that the inwardly-recessed bottom edges 114, 115 together extend along the entire bottom periphery of both sealing walls 11, 12 to form a peripheral inwardly-recessed bottom edge of the attachment portion 10.

It is shown that the inwardly-recessed bottom edge 114, 115 extends in vertical direction over a minor portion of the height of the respective sealing wall 11, 12. For example, the edge 114, 115 extends over between 5% and 20% of the height of the sealing wall and/or over a height between 0.5 mm and 2 mm, e.g. over about 0.8 to 1.5 mm.

A section of each of the sealing walls 11, 12 above the inwardly-recessed bottom edge 114 is defined as a nominal section 116 of the sealing wall. It is shown, e.g. in FIG. 6B, that the sealing walls each have a thickness "t" of the inwardly-recessed bottom edge thereof that is smaller than a nominal thickness "T" of the nominal section 116 of the sealing wall. In the present embodiment, the thickness "t" of the inwardly-recessed bottom edge 114 is between 80% and 95% of the nominal thickness "T".

It is illustrated that the thickness "t" of the inwardly-recessed bottom edge of the sealing walls is between 0.05 mm and 0.2 mm less than the nominal thickness "T", e.g. approximate 0.1 mm.

It is illustrated the at least one first stabilizing rib 15 and the at least one second stabilizing rib 16 do not project downwardly beyond the nominal section 116 of the sealing walls 11, 12.

In FIG. 6B, a magnification of the encircled area A-A in FIG. 6A is displayed. FIG. 6B shows part of the first sealing wall 11 of the attachment portion 10. In particular, FIG. 6B shows the central curved portion 113 of the first sealing wall 11.

It is shown in FIG. 6B that the first sealing wall 11 has the inwardly-recessed bottom edge 114. The second sealing wall 12 has a similar inwardly-recessed bottom edge, although this is not visible in the figures.

The inwardly-recessed bottom edge 114 extends over a portion h' of the overall height H of the first sealing wall 11. As preferred and illustrated, this portion h' lies in between 5% and 20% of the overall height H, for example having a height in between 0.5 mm and 2 mm, whereas the overall height H may be in between 5 mm and 20 mm.

A portion h of the height of the first sealing wall 11 above the inwardly-recessed bottom edge 114, is furthermore defined as the nominal section 116 of the first sealing wall 11 that forms the outer sealing surface 110. The height h of the nominal section 116 is, in the present embodiment, in between 75% and 95% of the overall height H of the first sealing wall 11.

The inwardly-recessed bottom edge 114 is, seen from the outer sealing surface 110 of the nominal section 116 of the first sealing wall 11, set in an inward direction At the inwardly-recessed bottom edge 114, the first sealing wall has a thickness t that is smaller than a nominal thickness T at the nominal section 116 of the first sealing wall 11.

Referring to FIG. 6A, it is shown that the ribs 151, 152, 153, 161, 162, 163 do not project over the entire height of the sealing walls 11, 12, but only over the nominal sections of the sealing walls 11, 12. The stabilizing ribs here have a height that corresponds to the height h of the nominal sections of the sealing walls 11, 12.

The FIGS. 14a-d illustrate an embodiment of the inventive spout wherein, as the spout 1' and in particular the attachment portion 10' thereof is of larger dimensions than the spout shown in FIG. 1, there is an additional intermediate stabilizing rib between each pair of inner and outer stabilizing ribs.

The attachment portion 10' has the same basic features as discussed herein with reference to the attachment portion 10.

The at least one first curved stabilizing rib here consists of an inner first stabilizing rib 151', disposed adjacent to the opening 21, an outer first stabilizing rib 152', disposed closer to the first pointed end 13, and an intermediate first stabilizing rib 155 located between the ribs 151' and 152'.

The at least one second curved stabilizing rib here consists of an inner second stabilizing rib 161', disposed adjacent to the opening 21, an outer second stabilizing rib 162', disposed closer to the second pointed end 14, and an intermediate first stabilizing rib 165 located between the ribs 161' and 162'.

It is illustrated that the curved stabilizing ribs form the sole stabilizers between the opposed sealing walls 11', 12'.

These inner stabilizing ribs have a continuous curvature over the length thereof, curved towards the first pointed end 13 and second pointed end 14, respectively.

The stabilizing ribs are integral at their upper end to the transverse wall 20.

A first connecting rib 153' extends between the inner first stabilizing rib 151' and the outer first stabilizing rib 152' and connects the central portions of all three first stabilizing ribs. Similarly, second connecting rib 163' connects the central portions of all three second stabilizing ribs. Both connecting ribs 153', 163' are located in a first vertical plane of symmetry through the pointed ends of the attachment portion 10'.

As illustrated, in practical embodiments, the connecting ribs 153', 163' have their upper end integral with the transverse wall.

As illustrated, in practical embodiments, the connecting ribs 153', 163' have a lower height than the stabilizing ribs.

FIGS. 7A-C are now discussed, in particular to elucidate the second aspect of the invention.

The FIG. 7A shows the spout 1 in cross-section, here in the second plane of symmetry M". Also depicted, yet with an exaggerated thickness, are a first pouch wall 101 and a second pouch wall 102. The FIG. 7A further illustrates two sealing jaws 210, 220 of a heat sealing device applied to heat seal the pouch walls onto the attachment portion 10 of the spout.

For the purpose of the following discussion, the FIG. 7A illustrates on the left, and in the enlargement of FIG. 7B, that the first sealing wall 11 has not yet been sealed against the first pouch wall 101, but is lightly clamped into contact by means of jaw 210. The FIG. 7A illustrates on the right, and in the enlargement of FIG. 7C, that the second sealing wall 12 has been sealed against the second pouch wall 102.

For the purpose of discussion, and as preferred, it is assumed herein that the sealing device is an impulse heat sealing device. Contrary to common heat sealing devices having continuously heated jaws, the jaws 210, 220 are configured and operated to create a brief heat impulse and subsequent cooling whilst the jaws 210, 220 are in the clamped position.

FIG. 7C and the left-hand part of FIG. 7A illustrate the clamped position of the jaws 210, 2020, preferably lightly clamped, wherein the inwardly-recessed bottom edge 114 defines an initially present groove "G" directly below the smooth outer sealing surface. This groove "G" is effectively formed between the inward offset vertical face of the edge 114 and the pouch wall, which pouch wall 101 is in full surface contact with the smooth outer sealing surface of the sealing wall.

As discussed, and as preferred, the front or contact surface of the sealing jaws 210, 220 have a complementary shape so as to achieve intimate full surface contact between the jaws and the pouch walls, and between the pouch walls and the smooth outer sealing surfaces.

In general terms, when the heat impulses are generated by means of the jaws 210, 220, the outer sealing surfaces of the sealing walls and the pouch walls are locally melted and fused together. As a result of the melting of the contacting surfaces of the spout and pouch walls, assisted by the clamping force, some of the molten plastic material flows away and into the groove "G" initially formed by the inwardly-recessed bottom edge 114.

This flow of molten material fills up the groove "G" that is initially formed by the inwardly-recessed bottom edge 114. The FIG. 7C illustrates that, as preferred, herein this escaping flow of molten material also forms, when solidified, a bead 103 of plastic material that protrudes below the bottom edge 114 of the sealing walls 11, 12. It is shown that this bead 103 is joined both to the pouch wall and to the bottom edge 114.

As explained, the formation of the bead 103 contributes to the strength of the seal, e.g. when tested in the drop test of a liquid filled pouch.

As explained, the effect illustrated in FIG. 7A-C is enhanced when the structure of the first aspect of the invention is applied in the spout, yet that is not a necessity. As discussed, this effect may also be achieved when the spout has another design of the one or more stabilizing ribs, e.g. straight as in the mentioned prior art. One could even envisage a completely different structure of the attachment portion, as long as the sealing walls 11, 12 have the smooth outer sealing surfaces border by the inwardly-recessed bottom edge.

As discussed, the jaws 210, 220 could include an elongated, impulse heatable resistor band that extends along the contoured front surface of the jaw and is covered by a heat-resistant non-stick covering, e.g. a Teflon tape. The heat impulse is then generated by briefly passing an electric current through the band, which is done with the jaws in clamped position. A cooling down is then allowed, or forced, e.g. by passing coolant through one or more ducts 216 in the jaws. The coolant could be circulated continuously through the jaws, as that does not impair the generation of the heat impulse.

In an embodiment illustrated in FIG. 7A, use is made of an impulse heat sealing device, wherein each of the first and second jaws comprises:
 at least one susceptor element 212, 222 comprising electrically conductive material, which extends along a recessed face portion and coplanar face portions of the contact or front face of the jaw 210, 220 and which is covered by a heat-resistant non-stick 213, 223 covering for contacting the first and second pouch walls in the clamped position of the first and second jaws,
 an inductor 211, 221 which is electrically insulated from the respective susceptor element 212, 222, wherein, preferably, the inductor comprises an elongated inductor section that extends along a rear side of the respective at least one susceptor element.

This sealing device is configured and operated to perform a sealing cycle, wherein—with the first and second jaws 210, 220 in the clamped positions thereof—a high frequency electric current source of the impulse sealing device is operated to temporarily feed a high frequency electric current to the inductor 211, 221 of each jaw, thereby generating a high frequency electromagnetic field with the inductors, thereby inducing eddy currents in the respective susceptor element 212, 222 with the high frequency electromagnetic field and generating an impulse of heat that is emitted by the susceptor element, which impulses of heat seal the first and second walls 101, 102 to the outer sealing surfaces of the attachment portion 10 of the spout and to each other on opposite sides of the attachment portion 10, e.g. in a top seam of a pouch. A cooling, after termination of the high frequency electromagnetic field, is performed, e.g. by cooling liquid circulating through one or more ducts 216 in the jaws, whilst the jaws 210, 220 remain in the clamped position.

In FIG. 8, an embodiment of an induction based impulse heat sealing device 200 is displayed schematically, partially in exploded-view, along with a pouch 100 and spout 1 that has already been sealed in the upper edge region of the pouch 100.

The sealing device 200 comprises:
 a first jaw 210 and a second jaw 220,
  an actuator device, here with actuator 201 for jaw 210 and actuator 202 for jaw 220, configured to move the first and second jaws 210, 220 relative to one another between an opened position and a clamped position,
 a cooling device 300 configured to cool each of the first and second jaws 210, 220.

The first jaw 210 has a first contoured front surface configured to contact the edge region of a respective first wall 101 of the pouch.

The second jaw 220 has a second contoured front surface configured to contact the edge region of a respective second wall 102 of the pouch.

The first and second contoured front surfaces each have a recessed face portion defining a recess R configured to receive therein a half of the attachment portion 10 of the spout 1.

The first and second contoured front surfaces each define, on opposite sides of the respective recessed face and adjoining said recessed face, coplanar face portions.

The recessed face is shaped to match the shape of the attachment portion 10 of the spout 1 and is composed of a central curved face portion between adjoining rectilinear face portions.

Each of the first and second jaws 210, 220 comprises at the respective contoured front surface thereof one single elongated, impulse heatable member 212, 222 that extends along the recessed face portion and the coplanar face portions of the respective front surface and that is covered by a heat-resistant non-stick covering (not shown in FIG. 8 for clarity).

The device is configured to perform an impulse sealing cycle as discussed herein, so that the spout 1 is sealed in the upper edge region and, as preferred, the entire upper edge region of the pouch 100 is hermetically sealed.

In the cycle, the actuator device 201, 202 is configured to bring the first and second jaws 210, 220 into the clamped position, so that—in the edge region—the first and second walls 101, 102 are clamped against the attachment portion 10 by the recessed faces in the front of the first and second jaws and so that—in the edge region—the first and second walls 101, 102 on opposite sides of the spout 1 are clamped against one another by the coplanar faces of the first and second jaws 210, 220.

Each impulse heatable member is a susceptor element 212, 222 comprising electrically conductive material. Each susceptor element has a rear side facing away from the respective contoured front surface of the jaw.

Each of the first and second jaws 210, 220 comprises an inductor 211, 221 which is electrically insulated from the respective susceptor element 212, 222. The inductors each comprises an elongated inductor section, here one pair of inductor sections, that extends along the respective contoured front surface at the rear side of the respective susceptor element.

The induction based heat sealing device further comprises a high frequency alternating electric current source 250, which is connected to the inductor 211, 221 of each of the first and second jaws 210, 220. In an embodiment, both the inductors 211, 212 are connected to one and the same source 250.

The device is configured to perform an impulse sealing cycle. Once the jaws 210, 220 have been moved into the clamped position as indicated above, the electric current source 250 is operated to temporarily feed a high frequency electric current to the inductors 211, 221. This generates a high frequency electromagnetic field by means of the inductors. In turn the high frequency electromagnetic field induces eddy currents in the respective susceptor element 212, 222 generating an brief and vehement impulse of heat that is emitted by the susceptor element 212, 222. These impulses of heat seal the edge region of the walls 101, 102 to the sealing faces of the attachment portion 10 and to each other in the portions of the upper edge region.

So the device is temporarily energizes the susceptor elements 212, 222 on the basis of induction, so as to generate an impulse of heat that is emitted by each of the elements 212, 222.

The first and second jaws 210, 220, at least the susceptor elements 212, 222 thereof, cool down after termination of the energizing assisted therein by operation of the cooling device 300.

The actuator device 201, 202 is configured to move the first and second jaws 210, 220 into the opened position after the cooling down has taken place in satisfactory manner.

It is shown in FIGS. 8 and 9, that in each jaw 210, 220 there is just one pair of elongated inductor sections 221a, b that extend horizontally, are parallel to one another, and are vertically spaced from one another by a horizontal slit 221c. The pair of inductor sections is arranged in proximity of the rear side of the susceptor element.

In an embodiment, the elongated inductor section 221a, b is made from a metal, e.g. of copper.

It is shown in FIGS. 8 and 9, that the at least one elongated inductor section 221a,b is a solid cross-section metal or other, preferably high conductivity material inductor section, e.g. made of copper which is preferred. This arrangement allows to avoid undue variations of current density within the inductor section, and thereby undesirable variation in the generated field, e.g. compared to an internally hollow inductor section.

It is shown in FIGS. 8 and 9, that the at least one elongated inductor section 221a,b has a constant cross-section, preferably a solid cross-section, over its length along the contoured front surface of the respective jaw. This design avoids undue variations of current density within the inductor section, which might otherwise occur at locations where the cross-section changes, and thereby undesirable variation in the generated field.

It is shown in FIGS. 8 and 9, that the uniform cross-section elongated inductor section 221a, b has, seen in a top view onto the jaw, a shape corresponding to the contoured front surface of the jaw and maintains a uniform distance between the susceptor element 222 and the elongated inductor section 221a,b. This arrangement enhances uniformity of the development of heat in the susceptor element.

The horizontal slit 221c can be air slit or a slit filled with electrically insulating material.

In embodiments, said slit 221c between neighbouring inductor sections 221a, b that are arranged above one another has a height between 0.01 and 5 mm, more preferably between 0.1 and 2 mm.

The presence of the slit 221c between the parallel elongated inductor sections 221a, b allows for a desirable concentration of the field that is generated by the inductor of the jaw onto the susceptor element 222. This is illustrated in FIG. 10.

In FIG. 11, the impulse heat sealing of edge regions of a first pouch wall 101 and of a second pouch wall 102, with a spout 1 in between them, is displayed schematically by means of steps (a)-(e).

In the displayed embodiment, the heat sealing device 200 comprises a first jaw 210 and a second jaw 220. During the production of the spouted pouches, the pouch or the pouch walls that are to be formed into a pouch, is/are moved continuously in a transportation direction (TR), from left to right in FIG. 11.

In the depicted embodiment, the jaws of the device 200 are configured to move along with the pouch walls 101, 102 in the transportation direction (TR), at least during the sealing cycle.

The sealing cycle starts with a step (a), shown on the left side of FIG. 11. The first jaw 210 and the second jaw 220 are initially in an opened position and spaced from the pouch walls 101, 102. These walls have a non-bonded, here upper, region, between them, with the spout 1 having been inserted with its attachment portion 10 in this opened region.

Upon operation of a first actuator device 201, the first jaw 210 is moved towards its clamping position, wherein the first jaw 210 comes in contact with the first pouch wall 101 and clamps, preferably lightly, the wall onto the corresponding outer sealing surface. Similarly, the second jaw 220 is moved towards its first contact position by a second actuator device 202, such that the second jaw 220 comes in contact with the second pouch wall 102 and clamps, preferably lightly, the wall onto the corresponding outer sealing surface. The spout 1 is now clamped, lightly as preferred, as no significant pressure is involved in the impulse heat sealing process, in between the first pouch wall 101 and the second pouch wall 102 and within the contour recesses in the front faces of the jaws.

Next, during step (b), the jaws 210, 220 remain in the clamped position and move along with the pouch walls 101, 102. Step (b) is an impulse sealing step, during which the heat impulse is generated. Here, as preferred, an electromagnetic field is created by means of the first inductor 211 and the second inductor 221, in order to induce eddy currents in the susceptor elements 212, 222, which generates respective heat impulses emitted by these elements 212, 222.

Under the influence of the brief heat impulses, the first pouch wall 101 and the second pouch wall 102 are locally fused with each other and with the spout 1 in between them, in order to heat seal the pouch walls 101, 102 to the spout attachment portion 10 and to fuse the pouch walls 101, 102 against each other next to the portion 10.

During step (c), the heat impulses have terminated as the inductors are no longer energized, but the jaws 210, 220 remain in their clamped positions. Cooling liquid is being circulated through the ducts 216 in the jaws 210, 220. Preferably, this supply of cooling liquid is continued during all steps (a)-(e) of the process. Accordingly, heat is removed from the fused areas as well.

Once cooling is sufficient, during step (d), the first jaw 210 and the second jaw 220 are moved away from each other, into the opened position.

As such, the pouch 100 provided with the spout 1 may be taken over by a further handling device, to allow for further processing thereof, such as filling of the pouch and/or closing of the pouch by application of a closure on the neck of the spout, etc. Upon moving them away from each other, the jaws 210, 220 again become spaced.

Finally, during step (e), the first jaw 210 and the second jaw 220 are moved back towards their initial position. This movement may take place in a direction opposite to the transportation direction (T), in order to effect that the jaws 210, 220 become arranged in their initial positions, similar as on the onset of step (a).

After moving the jaws 210, 220 back during step (e), the impulse heat sealing cycle is repeated, starting with step (a) again.

It will be appreciated that the path of the jaws 210, 220 can be of any suitable shape, e.g. circular, oval, linear, etc.

In FIGS. 12A-12C, another embodiment of the spout 401 is displayed, which has a plastic spout body that is made as a single piece by injection-moulding, for example of polyethylene (PE) material or polypropylene (PP).

The attachment portion 410 of the spout 401 has a first vertical plane of symmetry M' between a vertical first sealing wall 411 and an opposed vertical second sealing wall 412.

The first sealing wall 411 and the second sealing wall 412 each depend downward from a transverse wall and each have a bottom edge 514, 515 remote from the upper edge.

The attachment portion 410 has a second vertical plane of symmetry M" that is perpendicular to the first plane of symmetry M'. In FIG. 12C, a cross-sectional view in the second vertical plane of symmetry M" is displayed.

The spout 401 is embodied generally similar to the spout 1 in FIG. 1. Each sealing wall 411, 412 has one outer sealing surface 510, 520. These outer sealing surfaces 510, 520 of the sealing walls 411, 412 are to be heat sealed to a respective one of the pouch walls. As shown the outer sealing surfaces 510, 520 of the first sealing wall 411 and of the second sealing wall 412 are each embodied as a smooth outer sealing surface, so lacking any relief that would lead to entrapment of air, e.g. lacking weld lines, ribs, etc.

The first sealing wall 411 is composed of a first rectilinear portion 511, a central curved portion 513, and a second rectilinear portion 512, which are integrally interconnected end to end. Similarly, the second sealing wall 412 is composed of a first rectilinear portion 521, a central curved portion 523, and a second rectilinear portion 523, which are integrally interconnected end to end as well.

The smooth outer sealing surfaces 510, 520 are each bordered along their lower perimeter by an inwardly-recessed bottom edge 514, 515 of the sealing wall 411, 412. A vertical face of the edge 514, 515 is stepped inward of the adjacent vertical outer sealing surface 510, 520.

It is shown that the inwardly-recessed bottom edges 514, 515 together extend along the entire bottom periphery of both sealing walls 411, 412 to form a peripheral inwardly-recessed bottom edge of the attachment portion 410.

In contrast to the spout 1 shown in FIG. 1, this spout 401 does not have a straight horizontal lower perimeter of the bottom edge 514, 515. Instead, each of the sealing walls 510, 520 additionally comprises a respective pouch wall spacer portion 518, 519, which is located below the inwardly-recessed bottom edges 514, 515 of the sealing walls 510, 520. The pouch wall spacer portions 518, 519 each form a continuation of the inwardly-recessed bottom edge 514, 515 and are integrally connected thereto.

The pouch wall spacer portions 518, 519 serve the purpose of preventing the pouch walls from deforming inward locally, e.g. underneath the inwardly-recessed bottom edges 514, 515, e.g. as a result of cooling in the process of sealing of the spout 401 in between the pouch walls. By means of the pouch wall spacer portions 518, 519, the pouch walls are prevented from flexing inwardly, which may counter undue local shrinkage of the foil of the pouch walls.

A thickness of the pouch wall spacer portions 518, 519, preferably, substantially corresponds to the thickness of the inwardly-recessed bottom edges 514, 515, e.g. at least adjacent the inwardly-recessed bottom edges 514, 515. This thickness is smaller than a nominal thickness of a nominal section 516 of the sealing wall, in order to obtain the step between the nominal section 516 and the inwardly-recessed bottom edges 514, 515.

It is best shown in FIG. 12B that the pouch wall spacer portion 518 of the first sealing wall 411 is generally arranged in a region underneath the central curved portion 513 of the sealing wall 411, and only to a small extent underneath the straight portions 511, 512. The same applies for the second sealing wall 412, of which the pouch wall spacer portion 519 is not visible in FIG. 12B.

The lower contour of the pouch wall spacer portion 518 has a curved shape, e.g. seen in the horizontal direction in FIG. 12B, with a lowermost point in the plane M". Underneath the rectilinear portions 511, 512, the lower contour of the pouch wall spacer portion 518 curves upward to merge with the inwardly-recessed bottom edge 114.

The wall spacer portion 518, as preferred, has a height Q that is similar to the height h of the nominal portion 516 of the sealing wall 411.

In a practical embodiment of a spout the semi-circular shape of each of the portions 518, 519 in combination with the associated seal wall, including the bottom edge, is dimensioned for a finger of a user holding to pouch to get a grip thereon, e.g. the user gripping the pouch by placing a thumb on one side and an index finger on the other side. This is, for example, of benefit when the user drinks directly from the pouch via the spout.

In a practical embodiment, the length between the sharp ends of the attachment portion is 21 millimeters, and the height Q is between 2.5 and 4.5 millimeters, about 3.5 millimeters.

It is best shown in FIG. 12C that the thickness of a top part of the pouch wall spacer portions 518, 519 substantially corresponds to the thickness of the inwardly-recessed bottom edges 514, 515, but that lower parts of the guiding portions 518, 519 gradually taper inwardly. Hence, outer surfaces 518', 519' of these lower parts may gradually taper inwardly, whereas inner surfaces 518", 519" of these lower parts remain substantially straight.

The thicknesses of bottom parts of the pouch wall spacer portions 518, 519 can be made smaller than that of the top parts, since they may have a smaller contribution to the preventing of the flexing of the pouch walls. In this way, less plastic can be used for the spout 401, whilst still having good properties, e.g. in preventing flexing of the pouch walls. The pouch wall spacer portions 518, 519 could also have one or more holes therein to save plastic material.

FIG. 12D shows an alternative embodiment of the spout discussed above with reference to FIGS. 12A-C, in a view corresponding to FIG. 12C. The corresponding features of this spout have been denoted with the same reference numerals.

The spout 401 does not have a straight horizontal lower perimeter of the bottom edge 514, 515. Instead, each of the sealing walls 510, 520 additionally comprises a respective pouch wall spacer portion 518, 519, which is located below the inwardly-recessed bottom edges 514, 515 of the sealing walls 510, 520. The pouch wall spacer portions 518, 519 each form a continuation of the inwardly-recessed bottom edge 514, 515 and are integrally connected thereto.

To achieve a reduced thickness of the pouch wall spacer portions 518, 519 and an enhanced flexing behaviour, the portions 518, 519 have a cross-section tapering towards the lower edge. Herein, as preferred, the outer face of these portions 518, 519 are inwardly directed towards the lower end, e.g. forming an inward angle to the vertically arranged face of the bottom edge 514, 515. As a further reduction of the thickness, the inner face of each of the portions 518, 519 is outwardly offset from the associated inner face of the sealing wall 510, 520, as shown.

As preferred, the lower edge of the portions 518, 519 is rounded.

As preferred, the thickness substantially corresponds to the thickness of the inwardly-recessed bottom edges 514, 515, e.g. at least adjacent the inwardly-recessed bottom edges 514, 515. This thickness is smaller than a nominal thickness of a nominal section 516 of the sealing wall, in order to obtain the step between the nominal section 516 and the inwardly-recessed bottom edges 514, 515.

FIG. 12D also illustrates that the heat-sealing of the pouch wall 101 to the spout has resulted in solidified molten plastic material being present the groove that was initially formed by the inwardly-recessed bottom edge of the sealing wall. This material is fused to the bottom edge 514 and to the respective pouch wall 101.

In FIGS. 13A-13C, another different embodiment of the spout 601 is displayed, which has a plastic spout body that is made as a single piece by injection-moulding, for example of polyethylene (PE) material or polypropylene (PP).

The spout 601 in FIGS. 13A-13C is embodied similar to the spout 401 in FIGS. 12A—12C, also comprising and attachment portion 610 with two sealing walls 611, 612, each having a respective inwardly-recessed bottom edge 714, 715 remote from the upper edge. Each sealing wall 611, 612 has one outer sealing surface 710, 720, which are, as preferred, each embodied as a smooth outer sealing surface.

The sealing walls 611, 612 are each composed of a first rectilinear portion 711, 721, a central curved portion 713, 723, and a second rectilinear portion 712, 722, which are integrally interconnected end to end. The smooth outer sealing surfaces 710, 720 are each bordered along their entire bottom periphery by an inwardly-recessed bottom edge 714, 715 of the sealing wall 611, 612.

Each of the sealing walls 710, 720 of the spout 601 comprises a respective straight pouch wall spacer portion 718, 719. The pouch wall spacer portions 718, 719 are, similar to the spout 401 according to FIGS. 12A-12C, located below the inwardly-recessed bottom edges 714, 715 of the sealing walls 710, 720, being integrally connected thereto, and form a continuation of the inwardly-recessed bottom edges 714, 715.

The pouch wall spacer portions 718, 719 of the spout 601 extend across the entire bottom periphery of the sealing walls 611, 612 and each have a straight horizontal lower contour. The pouch wall spacer portions 718, 719 are present underneath the first rectilinear portions 711, 721, the central curved portions 713, 723 and the second rectilinear portions 712, 722. Accordingly, the pouch wall spacer portions 718, 719 are configured to prevent the pouch walls from deforming inwardly along the entire bottom periphery of the sealing walls 611, 612, as a result of cooling during sealing of the spout 601 in between the pouch walls. With these pouch wall spacer portions 718, 719, it may be effected that even larger portions the pouch walls may deform less and remain straighter after sealing.

It is shown best in FIG. 13B that the pouch wall spacer portion 718 has a height R that is similar to the height h of the nominal portion 716 of the sealing wall 611. The height R of the pouch wall spacer portion 718 is substantially constant along the entire width of the attachment portion 610. However, at one side of the attachment portion 610, e.g. at a first pointed end 613 thereof, the lower contour of the pouch wall spacer portions 718, 719 is curved upward slightly, so that the height R' of the pouch wall spacer portions 718, 719 is somewhat smaller here. At this elevated portion, the spout 601 may comprises its injection point 717 where molten plastic material has been injected in the mould during an injection-moulding manufacturing process.

A thickness of a top part the pouch wall spacer portions 718, 719 substantially corresponds to the thickness of the inwardly-recessed bottom edges 714, 715, e.g. adjacent the inwardly-recessed bottom edges 714, 715. This thickness is smaller than a nominal thickness of a nominal section 716 of the sealing wall, in order to obtain the step between the nominal section 716 and the inwardly-recessed bottom edges 714, 715. It is best shown in FIG. 13C that the thickness of lower parts of the pouch wall spacer portions 718, 719 gradually reduces, since inner surfaces 718", 719" of these lower parts gradually taper outwardly, whereas outer surfaces 718', 719' of these lower parts remain substantially straight.

The invention claimed is:

1. A spout adapted to be heat sealed in a non-bonded region between opposed first and second walls of a pouch, comprising a plastic spout body that has a passage for filling and/or discharging a substance into or out of the pouch,
   wherein the spout body comprises:
      an attachment portion having a first vertical plane of symmetry, a vertical first sealing wall, and an opposed vertical second sealing wall, and with a transverse wall which is integral with an upper edge of the first and second sealing walls, wherein the first sealing wall and the second sealing wall each depend from said transverse wall and each have a bottom edge remote from the upper edge,
   wherein each sealing wall has an outer sealing surface, wherein the outer sealing surfaces of the sealing walls are to be heat-sealed to one of the respective walls of the pouch,
   wherein each sealing wall is, seen in a bottom view of the attachment portion, composed of a first rectilinear portion, a central curved portion, and a second rectilinear portion,
   wherein the second rectilinear portion of the first sealing wall is integrally connected to the first rectilinear portion of the second sealing wall at a first pointed end of the attachment portion to define an acute angle between the two portions,
   wherein the second rectilinear portion of the second sealing wall is integrally connected to the first rectilinear portion of the first sealing wall at a second pointed end of the attachment portion to define an acute angle between the two portions,
   wherein the transverse wall has an opening therein,
   wherein the spout body further comprises:
      a tubular neck having a bore that adjoins the opening in the transverse wall, which tubular neck is integral with and extends upwards from the transverse wall, which tubular neck together with the opening in the transverse wall forms the passage,
   wherein the attachment portion further comprises:
      at least one first stabilizing rib extending between connection points to the second rectilinear portion of the first sealing wall and to the first rectilinear portion of the second sealing wall, and at least one second stabilizing rib between connection points to the first rectilinear portion of the first sealing wall and to the second rectilinear portion of the second sealing wall, wherein, seen in a bottom view of the attachment portion, the at least one first stabilizing rib is, between respective connection points, curved toward the first pointed end, and the at least one second stabilizing rib is, between respective connection points, curved toward the second pointed end.

2. The spout according to claim 1, wherein the outer sealing surfaces are smooth outer sealing surfaces to be sealed to a respective one of the pouch walls.

3. The spout according to claim 1, wherein the at least one first stabilizing rib comprises or consists of:

an inner first stabilizing rib, disposed adjacent to the passage, an outer first stabilizing rib, disposed closer to the first pointed end, and wherein the at least one second stabilizing rib comprises or consists of:

an inner second stabilizing rib, disposed adjacent to the passage, an outer second stabilizing rib, disposed closer to the second pointed end.

4. The spout according to claim 3, wherein the inner first stabilizing rib and the inner second stabilizing rib are arranged in proximity of the opening in the transverse wall and are connected to the rectilinear portions in proximity of a join to the respective central curved portion of the sealing wall.

5. The spout according to claim 1, wherein a radius of curvature of each first stabilizing rib and of each second stabilizing rib is larger than a radius of a circular opening in the transverse wall.

6. The spout according to claim 1, further comprising a first connecting rib, which extends between an outer first stabilizing rib and an inner first stabilizing rib, and a second connecting rib which extends between an outer second stabilizing rib and an inner second stabilizing rib, wherein the first connecting rib and the second connecting rib each extend in the first plane of symmetry.

7. The spout according to claim 1, wherein the outer sealing surfaces of the first sealing wall and of the second sealing wall are each embodied as a smooth outer sealing surface, and wherein said smooth outer sealing surfaces are each bordered by an inwardly-recessed bottom edge of the respective first and second sealing walls, and wherein the inwardly-recessed bottom edges extend along an entire bottom periphery of both sealing walls to form a peripheral inwardly-recessed bottom edge.

8. The spout according to claim 7, wherein the inwardly-recessed bottom edge extends in vertical direction over a minor portion of the height of the respective sealing wall.

9. The spout according to claim 7, wherein a section of each of the sealing walls above the inwardly-recessed bottom edge is defined as a nominal section of the sealing wall, and wherein the sealing walls each have a thickness at the inwardly-recessed bottom edge thereof that is smaller than a nominal thickness of the nominal section of the sealing wall, and wherein the thickness of the inwardly-recessed bottom edge of the sealing walls is between 0.05 mm and 0.2 mm less than the nominal thickness.

10. A spout adapted to be heat sealed in a non-bonded region between opposed first and second walls of a pouch, comprising a plastic spout body that has a passage for filling and/or discharging a substance into or out of the pouch, wherein the spout body comprises:

an attachment portion having a vertical first plane of symmetry, a vertical first sealing wall, and an opposed vertical second sealing wall, and with a transverse wall which is integral with an upper edge of the first sealing wall and with an upper edge of the second sealing wall, wherein the first sealing wall and the second sealing wall each depend from said transverse wall and each have a bottom edge remote from the upper edge, wherein each sealing wall has an outer sealing surface, wherein the outer sealing surfaces of the sealing walls are to be heat-sealed to one of the respective walls of the pouch, wherein each sealing wall is, seen in a bottom view of the attachment portion, composed of a first rectilinear portion, a central curved portion, and a second rectilinear portion, wherein the second rectilinear portion of the first sealing wall is integrally connected to the first rectilinear portion of the second sealing wall at a first pointed end of the attachment portion to define an acute angle between them, wherein the second rectilinear portion of the second sealing wall is integrally connected to the first rectilinear portion of the first sealing wall at a second pointed end of the attachment portion to define an acute angle between them, wherein the transverse wall has an opening therein, wherein the spout body further comprises:

a tubular neck having a bore that adjoins the opening in the transverse wall, which tubular neck is integral with and extends upwards from the transverse wall, which tubular neck together with the opening in the transverse wall forms the passage, wherein the outer sealing surface of the first sealing wall and the outer sealing surface of the second sealing wall is smooth, and wherein the outer sealing surfaces of the first sealing wall and of the second sealing wall are each bordered by an inwardly-recessed bottom edge of the respective first and second sealing walls.

11. The spout according to claim 10, wherein the inwardly-recessed bottom edges extend along an entire bottom periphery of both sealing walls and form a peripheral inwardly-recessed bottom edge.

12. The spout according to claim 10, wherein the inwardly-recessed bottom edges extends in vertical direction over a minor portion of the height of the respective sealing wall.

13. The spout according to claim 10, wherein a section of each of the sealing walls above the inwardly-recessed bottom edge is defined as a nominal section of the sealing wall, and wherein the sealing walls each have a thickness at the inwardly-recessed bottom edge thereof that is smaller than a nominal thickness of the nominal section of the sealing wall, wherein the thickness of the inwardly-recessed bottom edge of the sealing walls is between 0.05 mm and 0.2 mm less than the nominal thickness.

14. A collapsible pouch packaging comprising:
the pouch comprising opposed first and second walls made of a heat-sealable film material, defining an interior of the pouch in between opposed first and second the walls, and
the spout according to claim 10,
wherein the spout has been positioned, with the attachment portion, in the non-bonded region between the opposed first and second walls of the pouch, wherein the first pouch wall has been heat sealed to the outer sealing surface of the first sealing wall of the attachment portion, and wherein the second pouch wall has been heat sealed to the outer sealing surface of the second sealing wall of the attachment portion.

15. The pouch packaging according to claim 14, wherein a groove initially defined by the inwardly-recessed bottom edge of each of the sealing walls is filled with solidified molten plastic material.

16. The pouch packaging according to claim 15, wherein a bead of solidified molten plastic material is present under the filled groove initially formed by the inwardly-recessed bottom edge of the sealing walls, wherein said bead is fused to the bottom edge and to the respective pouch wall.

\* \* \* \* \*